United States Patent
Ralston

Patent Number: 6,094,625
Date of Patent: Jul. 25, 2000

[54] AUGMENTED VISION FOR SURVEY WORK AND MACHINE CONTROL

[75] Inventor: Stuart E. Ralston, Christchurch, New Zealand

[73] Assignee: Trimble Navigation Limited, Sunnyvale, Calif.

[21] Appl. No.: 08/887,964

[22] Filed: Jul. 3, 1997

[51] Int. Cl.[7] ....................................................... G09G 3/02
[52] U.S. Cl. ......................... 702/150; 364/188; 364/138; 239/161; 701/207; 703/702
[58] Field of Search ............................. 702/150; 364/188, 364/138; 239/161; 703/702; 367/436; 701/207; 434/29, 43, 49

[56] References Cited

U.S. PATENT DOCUMENTS

| | | | |
|---|---|---|---|
| 5,751,576 | 5/1998 | Monson | 364/188 |
| 5,812,257 | 9/1998 | Teitel et al. | 356/141.4 |
| 5,819,206 | 10/1998 | Horton et al. | 72/150 |

FOREIGN PATENT DOCUMENTS 9521395   8/1995   WIPO .

Primary Examiner—Kamini Shah
Attorney, Agent, or Firm—Blakely, Sokoloff, Taylor & Zafman LLP

[57] ABSTRACT

Methods and apparatus which enable use of augmented vision in survey procedures and related work. Virtual objects are presented to an operator on a see through display. Some of the objects correspond with real objects in the operators field of view at any instant and others may provide interactive functions for the operator. The operator eye positions are determined using measurements from a remote positioning system such as GPS, an operator head orientation sensing system, and knowledge of head geometry. Positions and attributes of real objects are stored in a database memory carried by the operator. The operators field of view is continuously determined and images of the real objects are generated from database information by a rendering system. The images are presented on the see through display as virtual objects. Numerous functions may be provided for the operator using virtual interactive objects, depending on the work at hand. Functions to assist navigation around a site, measurement of new survey points, virtual entry of control commands, site checking, and survey calculations such as intersections and offsets may be provided. One adaptation of the augmented vision system relates to machine control and enables an operator to guide a vehicle or the use of mechanical equipment.

34 Claims, 24 Drawing Sheets

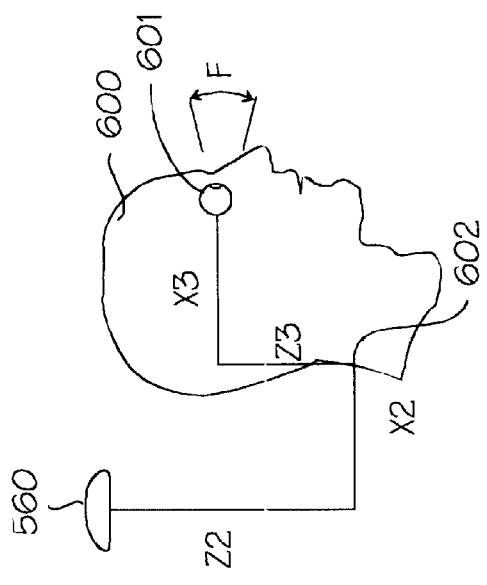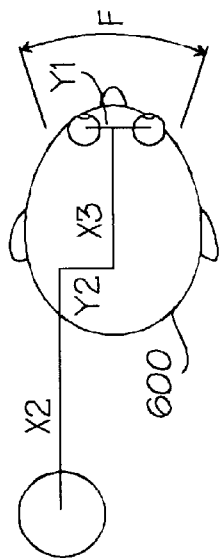
Fig. 6b
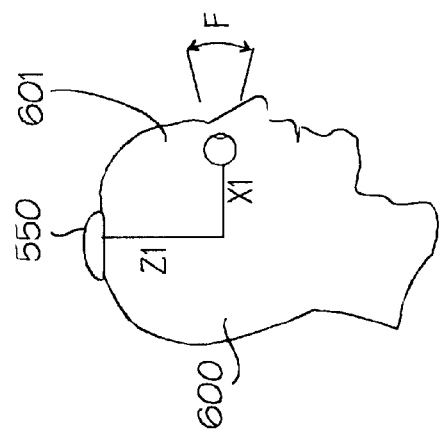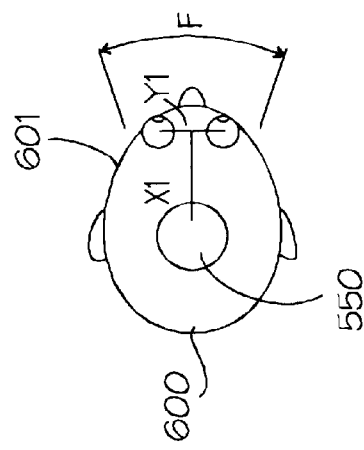
Fig. 6a

AUGMENTED VISION FOR SURVEY WORK AND MACHINE CONTROL

FIELD OF THE INVENTION

This invention relates to methods and apparatus which make use of augmented vision systems, particularly but not solely for procedures and equipment related to survey work and machine control. The methods and apparatus also make use of a remote positioning system such as GPS to determine the position of a human operator. They are especially, though not only suitable, for use with kinematic positioning techniques in which the position of a roving antenna/receiver can be determined to within a few centimetres or better.

BACKGROUND TO THE INVENTION

Traditional surveying involves two operators working with a theodolite and range pole, or a more complex optical electronic "total station". One operator generally positions the theodolite over a known control point while the other holds the range pole at a series of known or unknown points whose positions are to be checked or measured. A prism mounted on the range pole is sighted through the theodolite and accurate angular and distance measurements to the prism are taken at each point. The positions of the points can then be determined by trigonometry.

An approximately analogous process takes place in modern satellite based surveying. Current techniques involve a reference or base antenna/receiver located over a known point and a single operator who moves about with a roving antenna/receiver or "GPS total station". The operator stops on various generally unknown points to record position information in a data collector using signals transmitted by a minimum number of satellite sources which are above the horizon. Correction data is transmitted from the base site through a telemetry system. The roving antenna is also carried on a range pole which is held by the operator, although the antenna need not be within sight of the reference antenna. A vector or base line is determined from the reference site to the rover.

In real time techniques an actual position is determined and recorded at each point during a survey. Other techniques require post-processing in which data from both the reference and roving receivers is recorded for analysis and determination of actual position coordinates later. Most techniques are also either differential or kinematic. In kinematic surveying at least four satellites must be in view of each antenna at all times and centimetre level accuracy can currently be obtained. Five satellites are required for initialization. Differential surveying allows satellites to be temporarily blocked by obstructions between measurement points, and can provide submeter accuracy, which is sufficient for many purposes. In both kinds of technique actual positions are calculated as latitude, longitude and height with reference to the global ellipsoid WGS-84 or an alternative datum. Local northing, easting and elevation coordinates can then be determined by applying an appropriate datum transformation and map projection.

The satellite positioning system most commonly in use today is the Global Positioning System (GPS) although others such as the Global Orbiting Navigation System (GLONASS) are also in use or under development. Some land based systems which simulate satellite systems over a small area are also being developed to use non satellite signal sources. GPS is based on a constellation of 24 satellites operated by the US Department of Defense. The satellite positions are monitored closely from earth and act as reference points from which an antenna/receiver in the field is able to determine position information. By measuring the travel time of signals transmitted from a number of satellites, the receiver is able to determine corresponding distances from the satellites to the antenna phase center, and then the position of the antenna by trilateration. At present the information content of the satellite signals is deliberately downgraded for civilian users and hence the need to use a reference station for accurate work as mentioned above.

Surveyors and other operators carrying out survey related work use a range of equipment and procedures as will be described further below. A surveyor in the field typically carries a survey control device which provides a portable computer interface to the antenna/receiver. He or she generally navigates around a site setting out or checking the layout of survey points, and recording attribute information for existing features, using the control device as required. The device typically contains a database of points on the site, recorded or estimated during earlier work, and offers a variety of software functions which assist in the survey procedures. The operator is able to input information and commands through a keypad on the device, and view position coordinate data, and numerical or graphical results of the software calculations on a small display. For example, when staking out an item such as a line, arc, slope or surface on the site, the item is defined using existing points, a design point is specified as required, and the surveyor navigates to the point under guidance by the control device. A stake is placed in the ground as closely as possible to the point and the position of the stake is accurately measured using the range pole.

Under other circumstances an operator carrying out survey related work may be involved on a construction site, such as a building or roading project, setting out or checking survey points and design features as work progresses. For example, the operator may be a surveyor or engineer who guides construction workers to ensure that a design is completed according to plan. On other sites workers such as machine operators may be acting independently of a surveyor, following a simple plan based on survey work carried out at an earlier date. For example, a worker operating an excavator removes earth from a ditch in order to lay or repair a utility conduit along a surveyed path. Another worker operating pile driving equipment places piles to create foundations for a building or wharf according to a grid of surveyed or calculated locations. In each case described above, the surveyor, engineer, or machine operator makes use of survey information and visual observations of a physical environment while pursuing their work procedures. Such individuals carrying out a wide variety of survey related activities of this kind would benefit from equipment which provides one or more augmented vision capabilities.

Augmented vision systems that are currently available make use of head mounted display devices to superimpose virtual objects or information on an operator's field of view. Images of the objects are generated by a computer processor which is carried as part of the equipment, and are presented on a see through display in front of the operator's eyes. An image is usually calculated for each eye, as if the object was located at a plane several meters in front of the operator. Augmented vision systems have been under development for several years and a range of equipment is available for limited purposes. One example is the Personal Visual Display System described in WO 95/21395.

A determination of operator eye positions is required in order to calculate and superimpose a virtual object on a real world object in the operator's field of view. Sufficiently accurate positions can generally be determined by combining measurements of the operator head position and head orientation with knowledge of the head dimensions. Studies to date have measured head position using local positioning systems.

SUMMARY OF THE INVENTION

It is an object of the present invention to provide methods and apparatus which enable surveyors and other operators in survey related work to use augmented vision systems in the field. Head position measurements are made using a remote positioning system such as GPS and used to determine operator eye positions. Survey related information and a variety of capabilities can then be presented to the operator on a see through display.

The invention enables general methods of assisting and controlling survey procedures involving augmentation of an operator's field of view, including navigation, setting out and checking of survey points, calculation of functions such as intersections and offsets, measurement of points and checking of mechanical or engineering designs in progress, and presentation of satellite locations and a satellite elevation mask in virtual form. Functions involving use of virtual objects such as a virtual range pole or virtual survey controller device may also be provided. The invention further enables survey related procedures involving machine control.

Accordingly in one aspect, the invention may be said to consist in a method of assisting a survey procedure, in which an operator moves around a site setting out or checking the layout of a plurality of survey points, comprising: measuring a current position of the operator on the site using a remote positioning system, measuring a current head orientation of the operator as a visual observation of the site is made by the operator using a see-through display, determining a current field of view of the operator through the display according to the current position and current head orientation measurements, accessing a database containing information on the positions of the survey points to be set out or checked by the operator during the procedure, generating an image containing one or more representations of survey points in the database which are within the current field of view, presenting the image to the operator on the see-through display with the representations of survey points superimposed on their positions in the field of view, and generating and presenting subsequent images on the display as the operator navigates around the site between the points.

In a second aspect the invention may be said to consist in apparatus for assisting survey procedures in which an operator moves about a site setting out or checking survey points, or visualising or checking a design, comprising:

antenna/receiver means which are carried by the operator for use in relation to a remote positioning system, a headset which is worn by the operator including a see-through display and an orientation sensor, and computer processor/memory means which are carried by the operator, for connection to the antenna/receiver means, the display and the orientation sensor; wherein the processor combines measurements of current operator position from the antenna/receiver means, and measurements of current head orientation of the operator from the sensor, to determine a current field of view seen by the operator through the display, accesses a database stored in the memory to retrieve information relating to the positions of a plurality of survey points on the site, or to the positions of a plurality of points, lines, surfaces or other features in the design, and generates an image containing representations of the survey points on the site or of features in the design which lie within the current field of view, for presentation to the operator on the see-through display.

In a third aspect the invention may further be said to consist in a method of visualising or checking a civil, mechanical or engineering design during a survey procedure, whereby an operator inspects a site on which work will be or has been carried out, comprising: measuring a current position of the operator on the site using a remote positioning system, measuring a current head orientation of the operator as a visual observation of the site is made using a see-through display, determining a current field of view of the operator through the display using the position and head orientation measurements, accessing a database containing information on a predetermined layout of a plurality of points, lines, surfaces or other features in the design, generating an image containing representations of one or more of the features in the layout which are within the current field of view, presenting the image to the operator on the display with the representations superimposed on their predetermined positions in the field of view, and generating and presenting subsequent images on the display as the operator moves around the site and observes the design from different viewpoints.

In a fourth aspect the invention may also be said to consist in a method of assisting machine control, in which an operator drives or otherwise guides a machine around a work site or other terrain on which survey points have been set out, comprising: measuring a current position of the operator on the site using a remote positioning system, measuring a current head orientation of the operator as a visual observation of the site is made through a headup display device, determining a current field of view of the operator through the display device according to the current position and current head orientation measurements, accessing a database containing information on the survey points which have been set out around the site, generating an image containing representations of one or more of the survey points which are within the current field of view, presenting the image to the operator on the display with the representations of the points superimposed on their positions in the field of view, and generating and presenting subsequent images on the display as the operator guides the machine around the site.

Various other objects and aspects of the invention will become apparent from the detailed description and drawings which follow.

BRIEF DESCRIPTION OF THE DRAWINGS

Embodiments of the invention will be described with respect to the accompanying drawings, of which.

DETAILED DESCRIPTION

Figure 1:
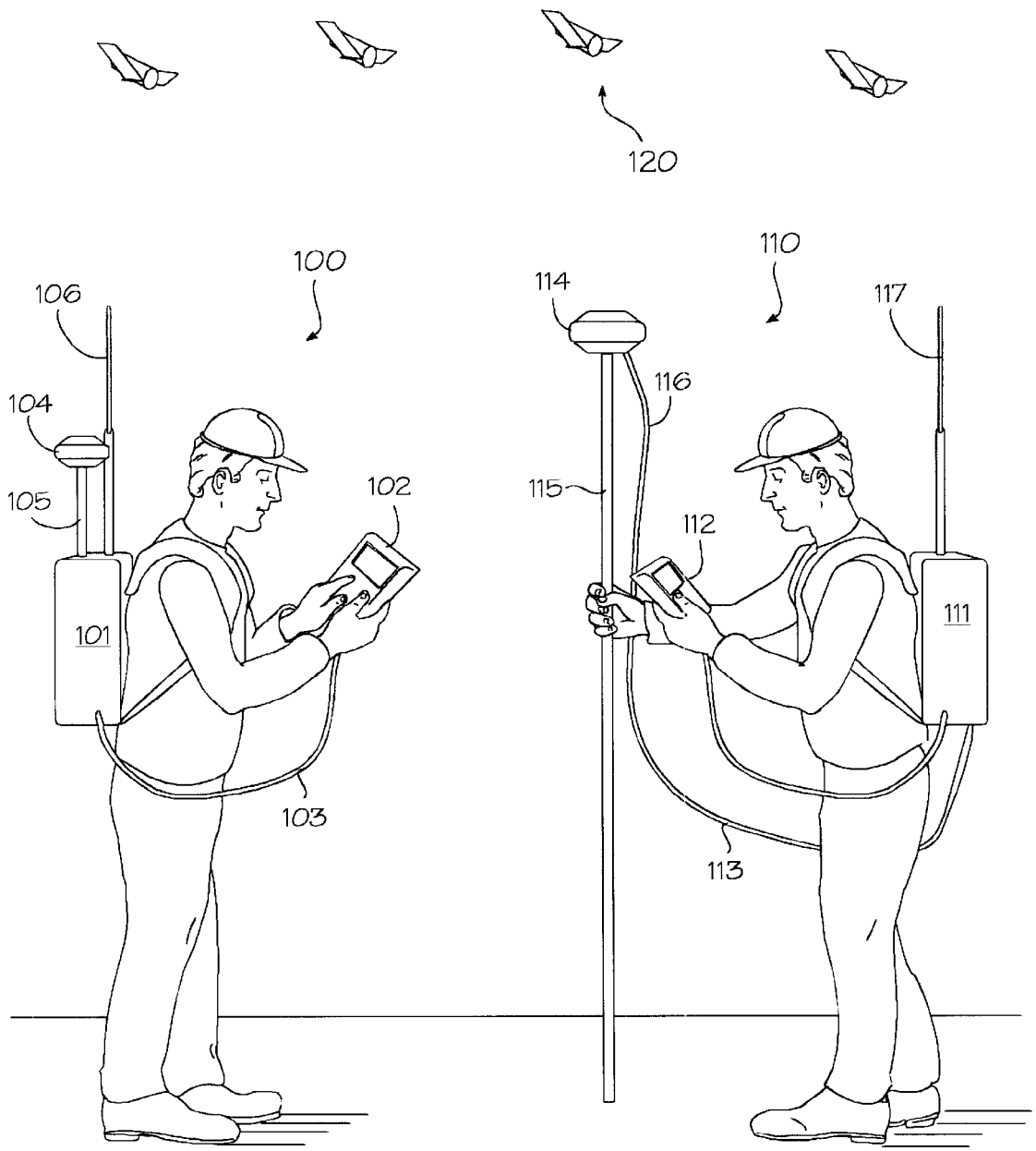
FIG. 1 schematically shows two survey operators at work using conventional antenna arrangements and a remote positioning system such as GPS.

Referring to these drawings it will be appreciated firstly that the present invention is useful with a wide range of survey techniques and in a wide range of environments where survey related work is carried out. In this specification "surveying" generally includes topographic, hydrographic, geodetic, detail, stakeout, site checking and monitoring, engineering, mapping, boundary and local control work, but without limitation. Particular environments include land subdivision and estate development, cadastral surveying, forestry, farming, mining and earthworks, highway design work, road reconstruction, building construction, and marine development projects, but also without limitation, and all under a wide range of weather and ground conditions. Several techniques and environments have been indicated by way of example only. Further, an "operator" is not necessarily a surveyor but may be a less extensively trained individual.

It will also be appreciated that augmented vision apparatus according to the invention is potentially useful with any remote positioning system which is suitable for survey work, whether satellite or land based. Satellite based systems currently available include the global positioning system (GPS) and the global orbiting navigation system (GLONASS). Several similarly accurate land based radio navigation systems are under development and might also be used, such as those which emulate a configuration of satellites over a relatively small geographical area for specific purposes. A detailed discussion of surveying techniques and remote positioning systems is beyond the scope of this specification, which refers primarily to GPS based kinematic survey procedures, but once again without limitation.

It will be further appreciated that the invention may be implemented in conjunction with a wide variety of survey related equipment which is available from a number of manufacturers. The size, configuration, and processing capability of such equipment are continually being improved and redesigned. This specification primarily describes survey related equipment which is currently available from Trimble Navigation Limited in Sunnyvale, Calif. and augmented vision equipment which is available from Virtual I/O Inc. in Seattle, Washington, but yet again without limitation. Other equipment commonly used in virtual reality or augmented reality systems is also described.

For example, this specification primarily describes conventional equipment in which the antenna, receiver and handheld data collector of a GPS total station are provided as separate items connected together by suitable cables. A typical stand alone receiver and data collector are the Trimble 4000 SSi™ and TDC1™ Survey Controller respectively, coupled to a dual frequency antenna. Another typical data collector is the TFC1™ pen computer which is commonly used for mapping purposes. A data collector in this form provides a convenient portable interface by which an operator controls the receiver, stores position data and may be guided through parts of a survey related procedure. However, receiver devices take many forms and may be incorporated within the antenna housing, as in the Trimble 4600 for example, or within the data collector, by way of a PCMCIA (Personal Computer Memory Card International Association) card in a laptop computer, as in the Trimble PC Card 115™. These and other arrangements of equipment are also within the scope of the invention without limitation.

FIG. 1 shows two survey operators 100 and 110 at work recording position data using respective roving apparatus, and receiving remote positioning signals from four GPS satellites 120. Operator 100 is using a satellite antenna, receiver and telemetry system carried in a backpack 101, controlled by a handheld computer device 102 for data collection, connected through cable 103. The satellite antenna 104 is mounted on a short pole 105, and a telemetry antenna 106 is the only other visible component of the system in this view. Operator 110 is carrying a receiver and telemetry device in backpack 111, controlled by a special purpose handheld computer 112 through cable 113. A satellite antenna 114 is mounted on range pole 115 and connected to the receiver through cable 116. When not in use the computer 112 may be clipped to the pole 115 or the backpack 111. Only a telemetry antenna 117 is visible in the backpack. Operator 100 is recording position information without attempting to locate the antenna over a specific ground point, perhaps for municipal mapping purposes. Operator 110 is recording relatively more accurate information, placing the range pole vertically over a ground point of particular interest, perhaps at a building construction site. The position of the ground point is then determined from the position of the antenna phase centre by subtracting the length of the pole. Their typical measurement accuracy ranges are 1–10 m and 1–100 cm respectively, although accuracy varies widely depending on a large number of practical factors. They may be recording data in real time or for post processing, and may be using kinematic or differential techniques.

Figure 2A:
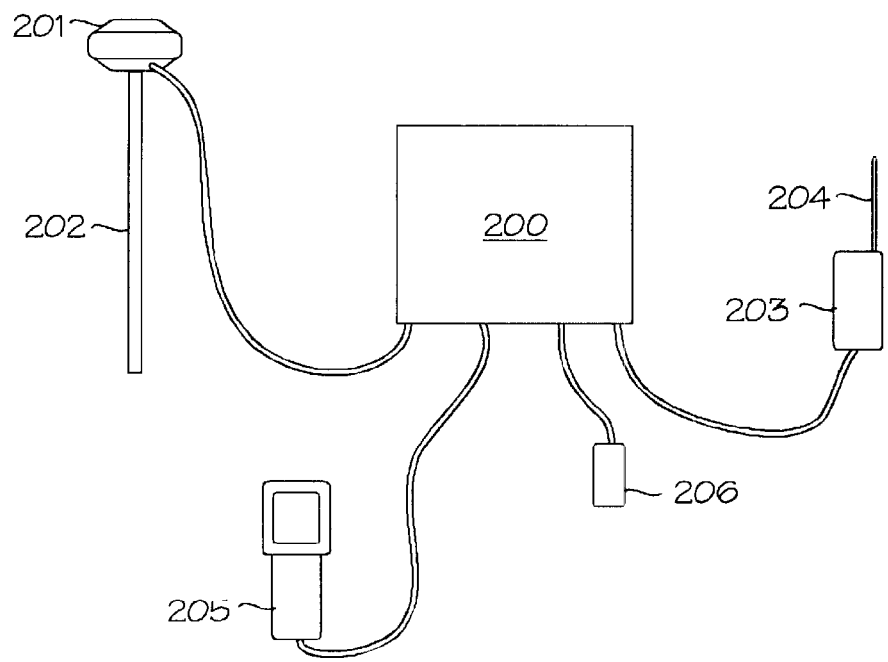
FIGS. 2a and 2b are schematic views of conventional roving and base station equipment which may be used by operators such as those in FIG. 1, FIGS. 3a and 3b are perspective views of a residential development site and an earth moving operation to demonstrate several environments in which operators may work.
Figure 2B:
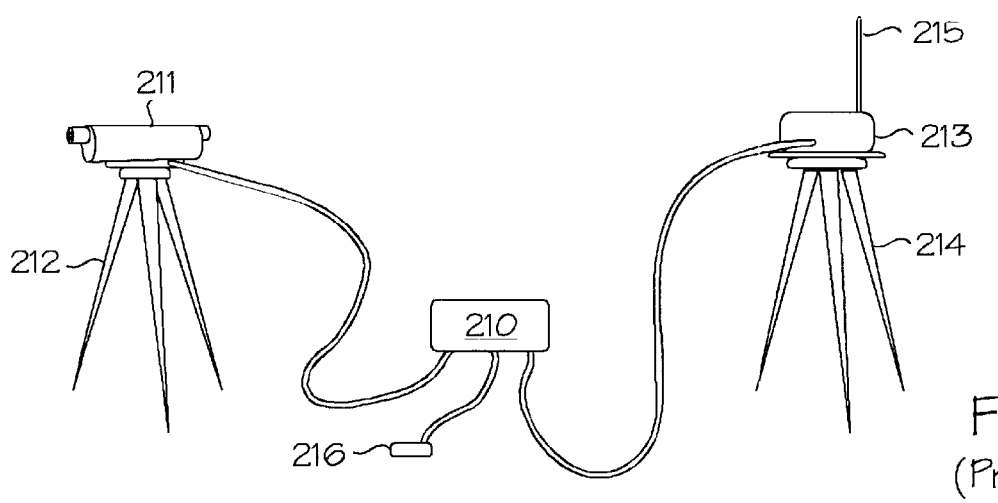

FIGS. 2a and 2b show typical equipment which might be used in the field by one of the operators in FIG. 1, bearing in mind the many alternative arrangements such as those mentioned above. FIG. 2a shows roving equipment including a satellite receiver 200, satellite antenna 201 on pole 202, telemetry receiver 203 and antenna 204, and a data collector and controller 205. The satellite receiver 200 is powered by a battery source 206 which may also power the telemetry receiver and the controller if these components have no separate power supply. Both the satellite antenna and the telemetry antenna/receiver pass data to the satellite receiver for processing along cables as shown, and the results are generally stored in the controller, although they may alternatively be stored in the satellite receiver for example. FIG. 2b shows a reference base station which is temporarily positioned over a point having a known or assumed position, to generate correction data as generally required for measurements made using kinematic or differential techniques. Fixed reference stations are sometimes maintained separately for particular areas by service organizations and need not always be set up by an operator. The base equipment includes a satellite receiver 210, satellite antenna 211 on tripod 212, telemetry receiver 213 and antenna 215 on tripod 214, and a battery pack 216 for the satellite receiver and other components as required. The satellite antenna passes data to the satellite receiver for processing which in turn stores or passes correction data to the telemetry receiver for transmission to the roving equipment.

Figure 3A:
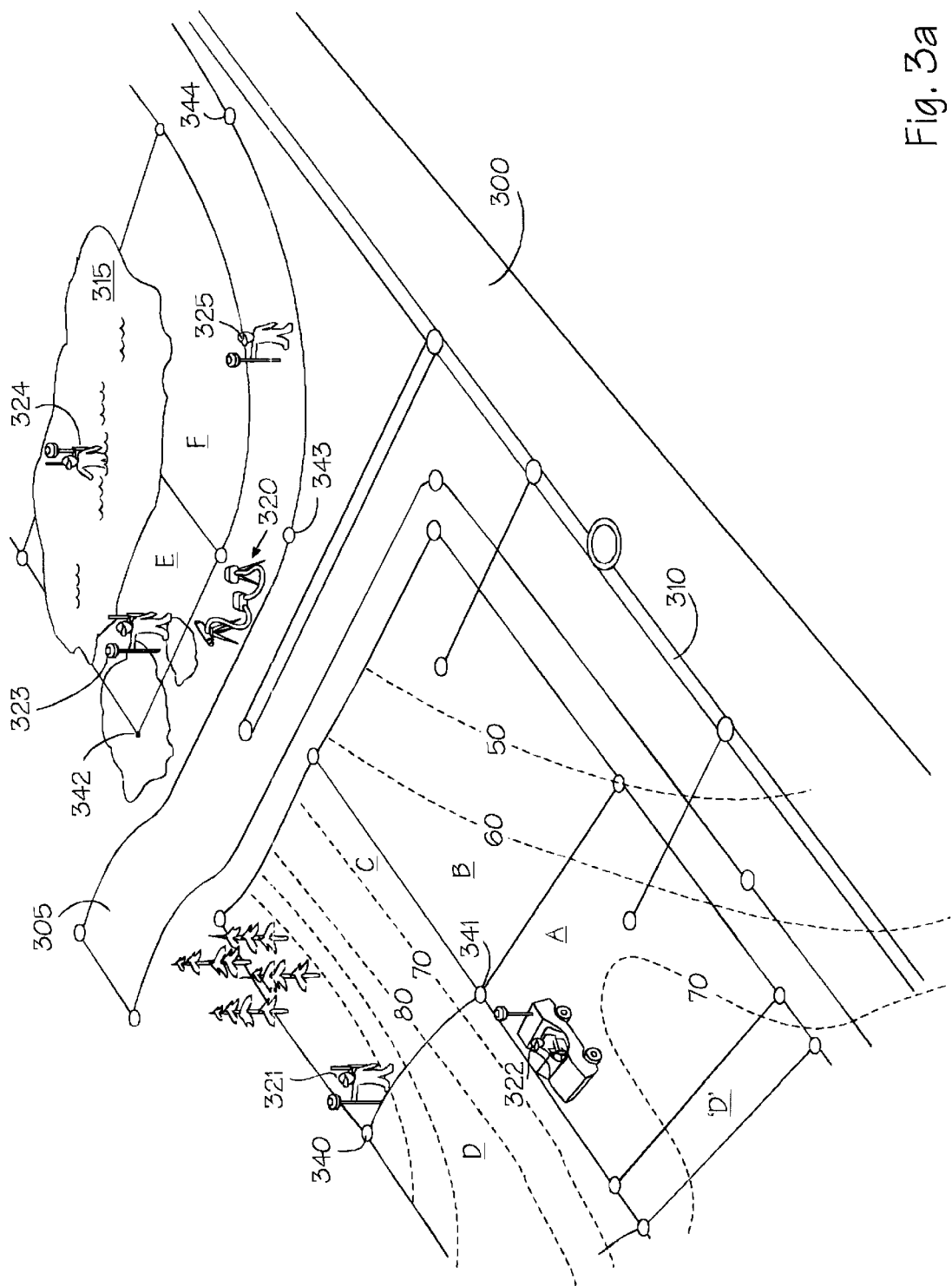
Figure 3B:
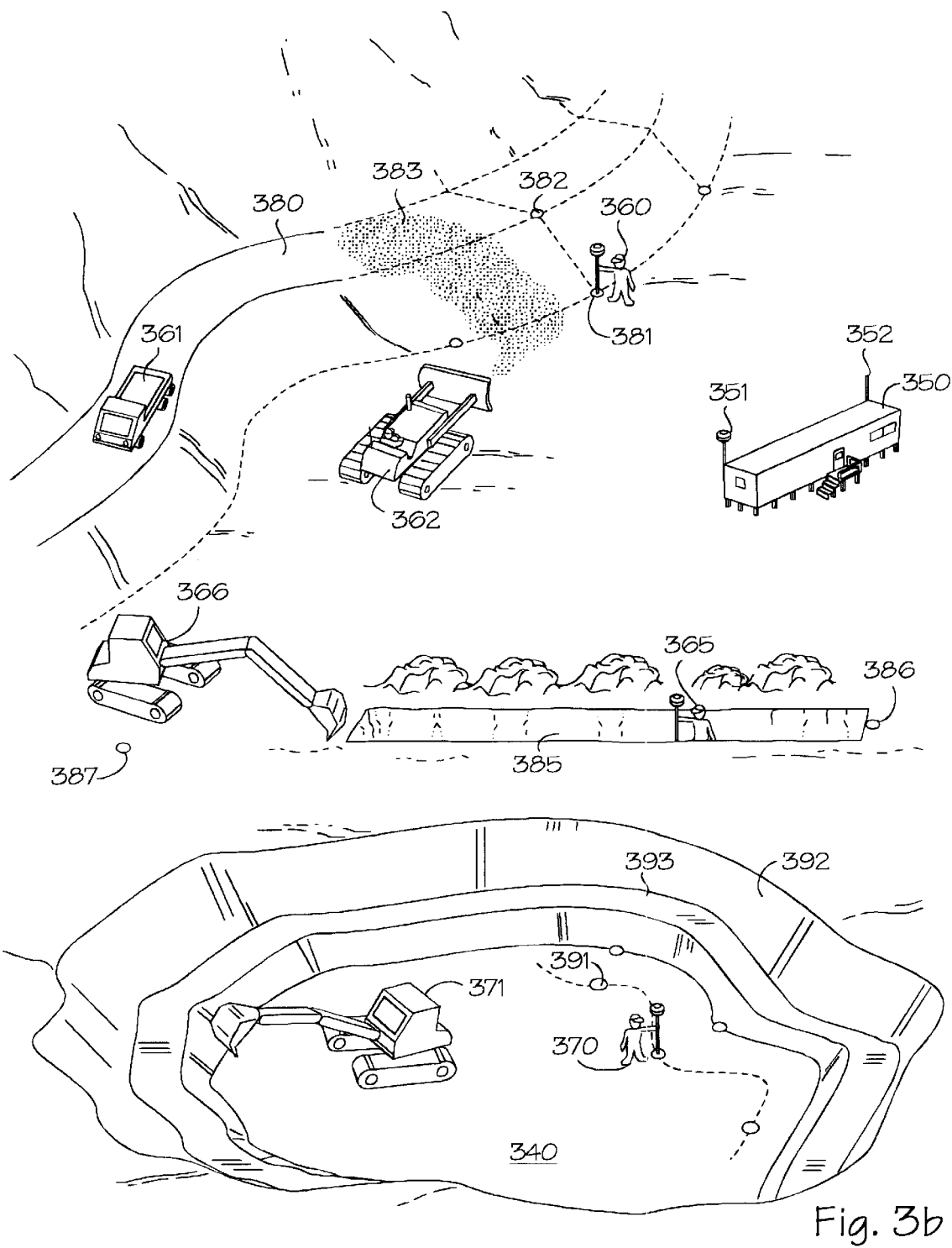

FIGS. 3a and 3b show a number of survey and machine operators at work in various idealized environments, as separate examples. An augmented vision system according to the invention as will be described below, might be used by each operator in navigating, acquiring data, calculating results, checking work, and so on, according to the particular need. The examples are intended to convey at least part of the broad range of work carried out by surveyors and machine operators and are not limiting in this regard. They are simplistic but will nevertheless be suggestive to the skilled reader.

In FIG. 3a several residential property areas have been surveyed for development at a junction between two streets 300 and 305. A water main 310 has been installed for access by houses which may eventually be built on the properties. Each street and property area has corner points, boundary lines and other features whose positions and attributes have already been determined in earlier work and stored as database information which is available to the operators. Many of these points will be marked by monument pegs. Some of the points are indicated in the figure as small circles. The positions of other points and features have yet to be measured, and in many cases the points themselves will not be ascertained until further development takes place. Properties A, B, C, D slope down towards street 300 as indicated by contour lines. Properties A and B are rectangles separated by narrow footpaths from streets 300 and 305, and each has a supply pipe already laid from the main 310. Property C has a number of trees the positions of which are not yet known. Property D has a driveway D' to street 300. Both will require a supply pipe from the main 310 on either street at some stage. Properties E and F include swampy ground 315 which will require some infill and landscaping before building takes place. A broad curved verge separates these properties from streets 300 and 305.

A reference base station 320 such as that shown in FIG. 2b has been set up on street 305, to transmit correction data for roving equipment such as that shown in FIG. 2a, carried by the survey operators in their example tasks. An operator 321 such as surveyor 110 in FIG. 1 is navigating along a line joining points 340 and 341 to record the elevation of points on the boundary between properties C and D. He or she may be using kinematic, differential or other techniques, and may be recording points as actual positions in real time or as raw data for post processing later. Another operator 322 such as operator 100 in FIG. 1 is driving an offroad vehicle over the various properties recording data for a map, although in this case the roving equipment may be mounted on the vehicle itself rather than carried in a backpack. Operator 323 is searching for the monument at point 342 which has been overgrown by vegetation, having navigated on the site using information presented by the roving apparatus. Operator 324 is recording the depth of swampy area 315 at predetermined points to provide an indication of how much infill will be required. An approximate volume of infill can be calculated once the perimeter and bottom contours of the swamp have been determined. Operator 325 is staking out an arc between points 343 and 344 to define a curved corner line on one side of streets 300 and 305. This is one example of survey calculations which may be carried out in the field involving lines, arcs, intersections and other mathematical constructs.

In FIG. 3b survey operators carrying roving equipment go about various idealized tasks relating to earthmoving, including road building, ditch digging and open cast mining, again all by way of example. A number of earthmoving machines are also shown with their activity controlled by respective machine operators who work to guidelines set out by the survey operators. A reference station is typically set up to provide correction data for the roving equipment at each site and for the purposes of these examples is located in a workers shelter 350. Only the satellite antenna 351 and telemetry antenna 352 of the reference station can be seen. A survey operator 360 is slope staking the sides of an elevated roadway 380 using measured positions such as 381 to calculate desired positions such as 382 to which road fill 383 must be piled. A truck 361 supplies road fill material and a bulldozer 362 shapes the material according to directions given to their respective machine operators by the operator 360 or a supervisor on the site. Another survey operator 365 is checking the work of an excavator 366 in digging a ditch 385. The ditch must be dug by the machine operator to a required width and depth along a line between points 386 and 387. Finally a survey operator 370 is determining a cut pattern for an excavator 371 in the bottom of an open cast mine 390. A pattern of measured ground points such as 391 is required to ensure efficient removal of ore from the mine while maintaining stability of the mine walls 392 and a spiral road 393.

Figure 4A:
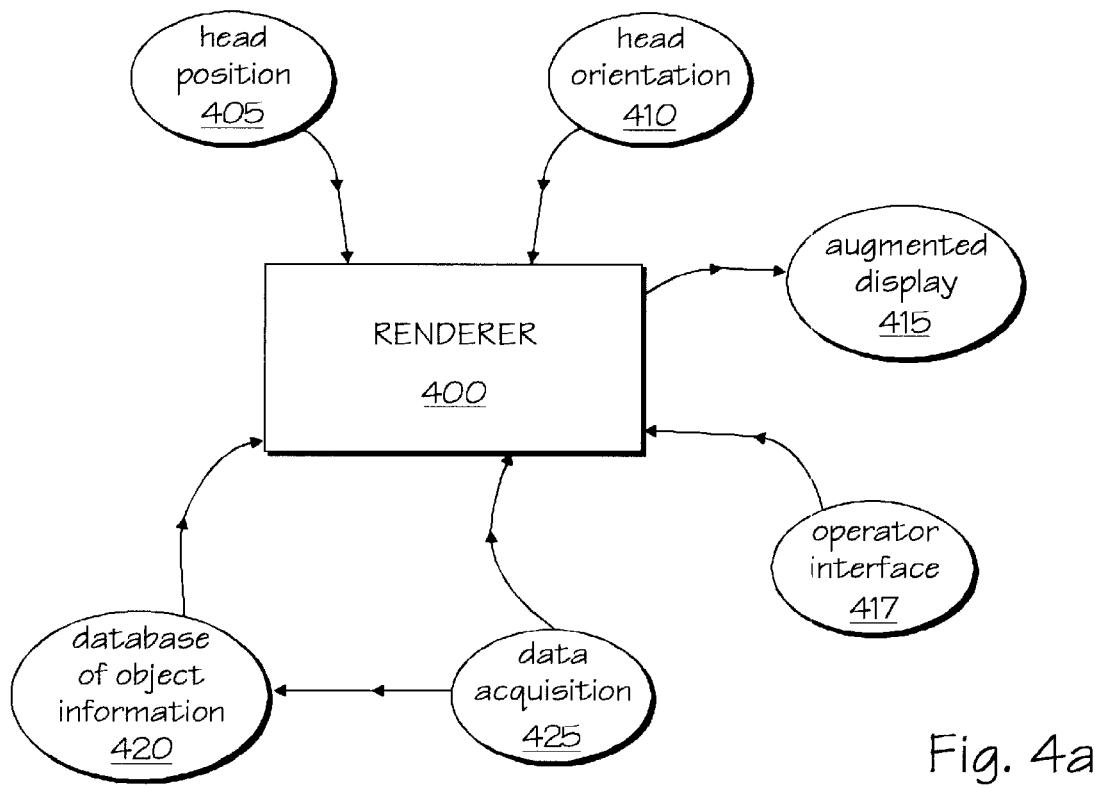
FIG. 4a is a schematic representation showing general flow of information between hardware, software and database components in a preferred embodiment of roving apparatus according to the invention.
Figure 4B:
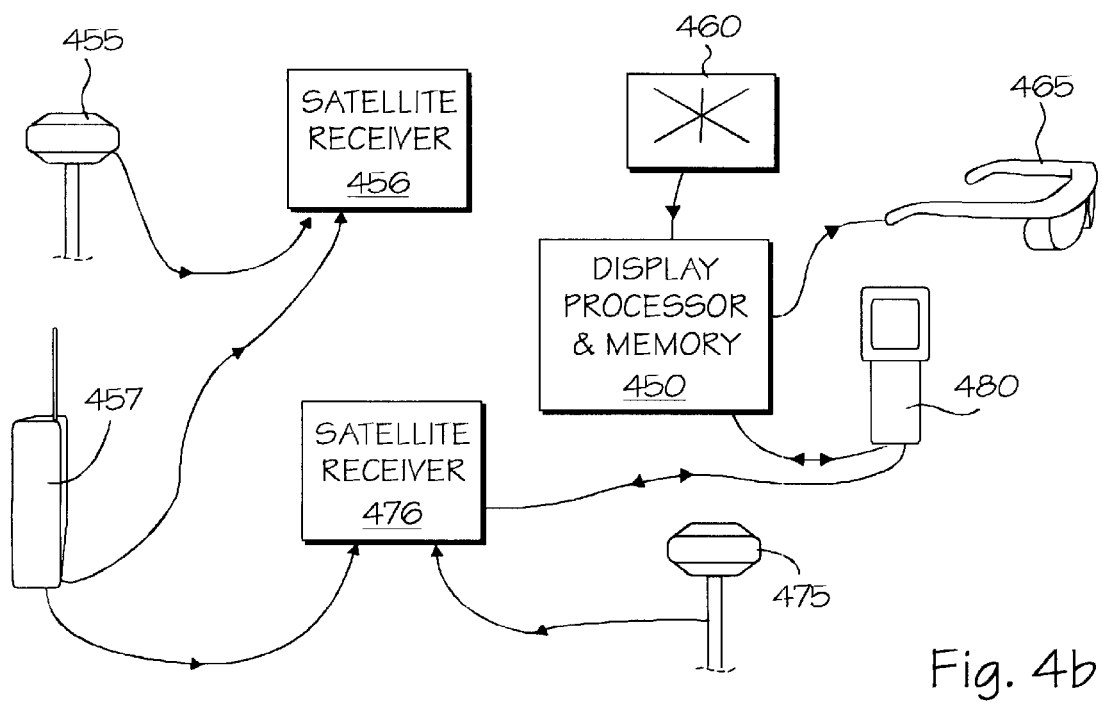
FIG. 4b is a schematic representation showing general lines of communication between hardware components of the preferred embodiment.

FIGS. 4a and 4b show the elements of a preferred embodiment of the roving survey apparatus which may be carried by a survey operator at work in the field, to provide an augmented vision capability according to the invention. FIG. 4a is a schematic diagram showing generalized hardware, software and database components of the apparatus and connections between them. A rendering system 400 determines the operator's current field of view by estimating operator eye positions using information from a real time head position system 405, a head orientation system 410, and information relating to dimensions of the operator's head and the headset. The field of view generally contains real "objects" which are being observed in the environment by the operator, or may be hidden from sight, and is augmented with images of virtual "objects" which are generated by the rendering system and presented on a display 415. These virtual objects include representations of selected physical items and mathematical constructs, with associated attribute information. They are typically superimposed by the display on corresponding real objects in the field of view, such as the physical items themselves or one or more survey points. The operator controls the apparatus through an interface 417 which may be partly implemented through the display 415. Position and attribute information relating to selected real objects in a particular environment is stored in a database 420 which is accessed by the rendering system to generate the corresponding virtual objects. The database information is generally prepared beforehand from survey results recorded in the environment during earlier work, or added by the operator during the current work using an optional but generally desirable data acquisition system 425. Other database facilities would also normally be carried by the roving apparatus such as an almanac of satellite information. Some example fields of view are given below.

FIG. 4b is a further schematic diagram showing an arrangement of currently available hardware components for the preferred roving survey apparatus. This is one embodiment of the invention which incorporates apparatus as previously described and shown in FIG. 2a. The rendering system 400 and object database 420 shown in FIG. 4a are provided generally as a separate processor and memory unit 450. The head position system 405 is provided by a satellite antenna 455, satellite receiver 456, and telemetry antenna/receiver 457, with the satellite receiver connected to the display processor 450 by an appropriate cable to pass position data. Head orientation system 410 is provided by a head mounted sensor 460 again connected to the display processor by an appropriate cable to pass orientation data. Augmented display 415 is provided by a headset 465 and typically receives a VGA signal from the rendering system. Boundaries are generally imposed above and to either side of the operator's peripheral vision by mechanical components of the headset, and these generally determine the angular extent of the field of view. The operator interface 417 is provided by a controller 480 similar to that shown in FIG. 2a and explained further in relation to FIG. 4c, bearing in mind alternative arrangements as mentioned below. The optional data acquisition system 425 is provided by a second satellite antenna 475 and receiver 476, the telemetry antenna/receiver 457, and a controller 480. New position data obtained using the acquisition system is typically processed in the controller before being passed to the display processor and memory to be stored in the object database. Attribute information relating to the new data or to existing data is entered by the operator through the controller for storage in the database. New virtual objects such as the results of survey calculations that may be carried out by the operator using the controller are also stored in the database as required.

The apparatus of FIG. 4b can be provided in a variety of different forms which is typical for GPS and other remote positioning equipment as mentioned above. For example, the two satellite receivers 456 and 476 which are shown separately may be combined in a single unit or may be built into the housings of their respective antennas 455 and 475. The display processor and memory 450 may be combined with the headset 465 or the controller 480 each of which generally requires a respective processor and memory. In a preferred embodiment the display processor and memory, and the controller, can be provided together by a handheld or similarly portable computer using a single general purpose processor and memory for both functions. The receivers 456 and 476 could also be included in a portable arrangement of this kind. In some currently available equipment the antenna, receiver and controller are combined in a single handheld unit, which is useful for recreational purposes such as hiking or boating. In other arrangements to be described below, the data acquisition antenna 475 or the controller 480, or both, are provided as virtual objects which may be manipulated by the operator as result of possibilities created by the present invention.

Figure 4C:
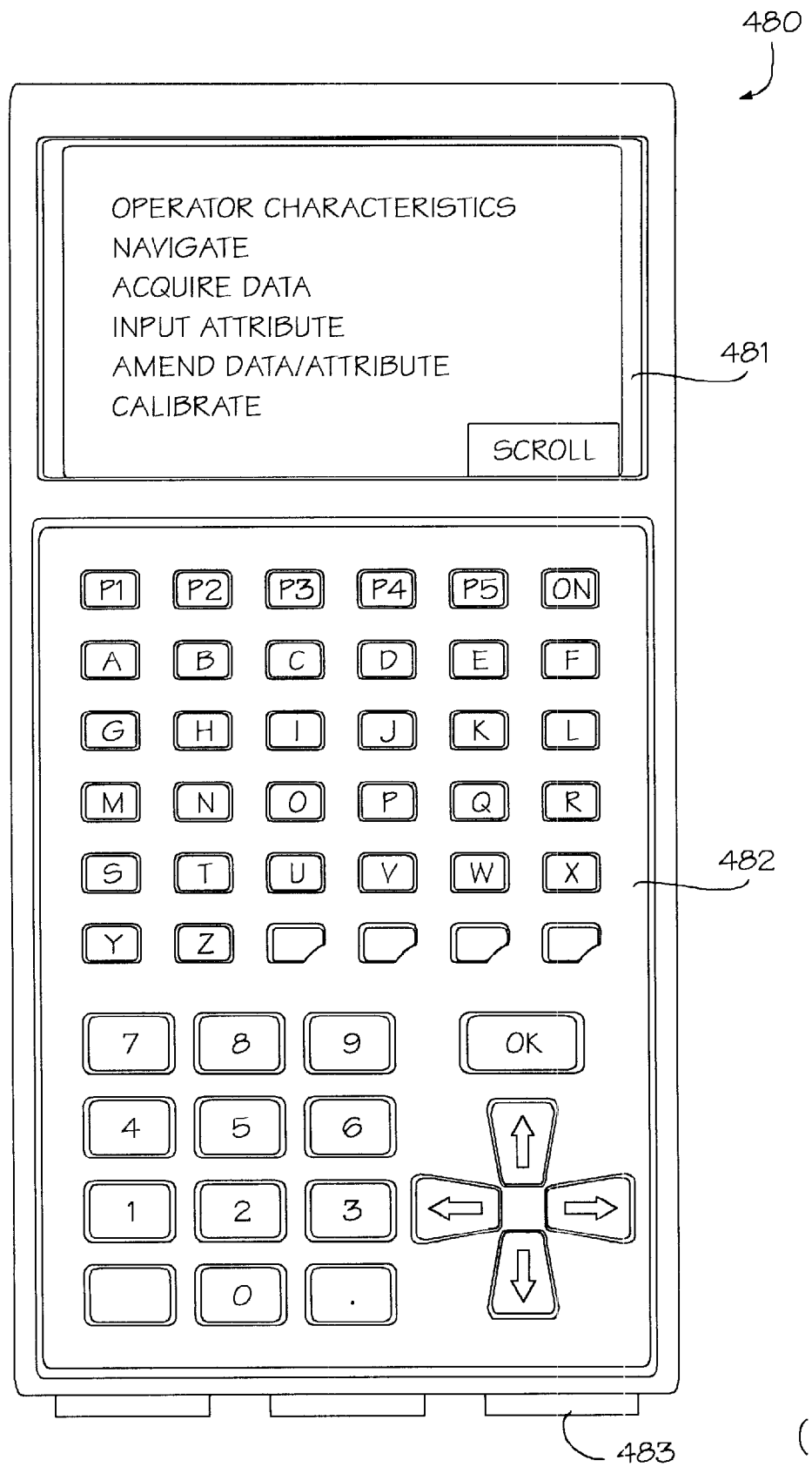
FIG. 4c shows a controller device which is part of the apparatus in FIG. 4b and may be used by an operator when interacting with the apparatus.
Figure 14:
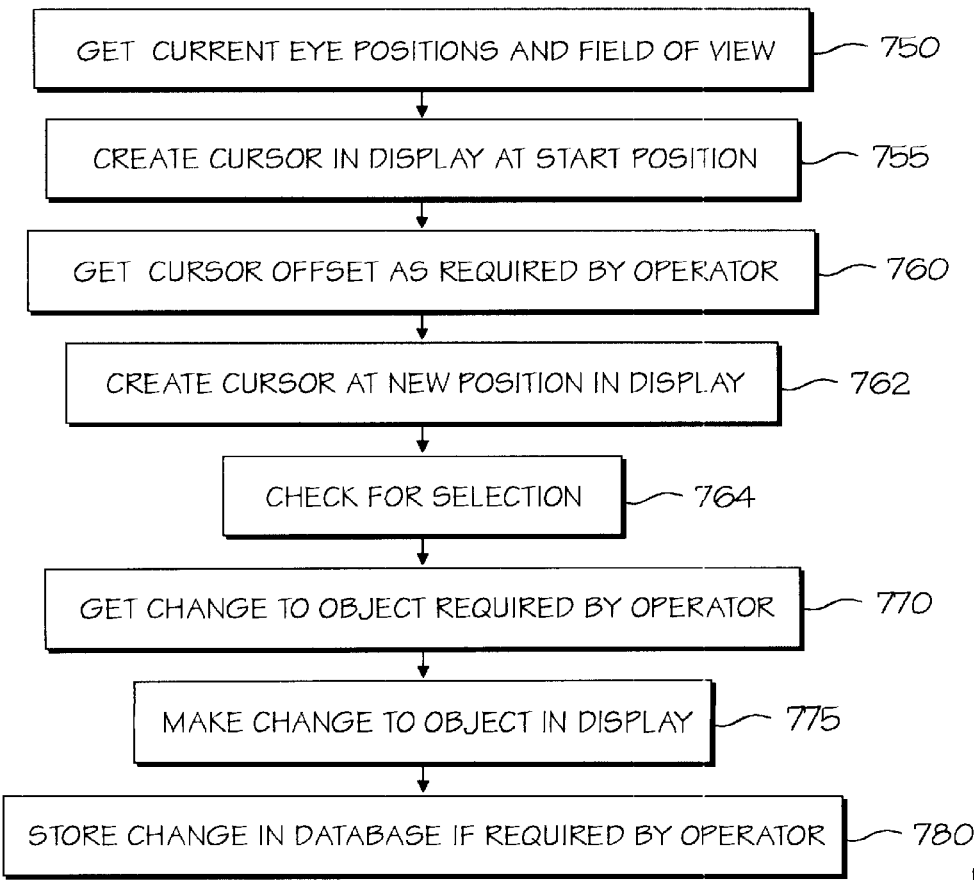
FIG. 14 is a flowchart indicating how attribute information such as shown in FIG. 13 may be modified.

FIG. 4c illustrates a handheld controller 480 such as shown schematically in FIG. 4b, generally similar in appearance to existing devices such as the TDC1. This provides one interface by which an operator may interact with the preferred roving apparatus during a survey procedure. An alternative virtual controller system is described below in relation to FIG. 17. A partial or fully voice operated controller system might also be used. The controller 480 is an electronic device having internal components such as a processor, memory and clock which will not be described. Externally the device has a multiple line screen 481 such as an LCD, a keypad 482 such as an array of touch sensitive buttons, and a number of input/output ports 483 for connection to other devices in the roving apparatus. The screen 481 shows by way of a simplistic example, a number of high level functions through which the operator is scrolling for selection. These include input of operator head characteristics as described below in relation to FIGS. 6a and 6b, a navigation function as described in relation to FIG. 11, data acquisition perhaps using a virtual pole collector as in FIG. 15, input of new attributes for features already existing in the database 420 or recently acquired, alteration of stored data or attributes using a virtual system such as shown in FIG. 14, and a calibration function by which the operator may adjust an offset in the display 415 to align virtual objects more closely with their corresponding real objects if required. Other functions described below include calculation of intersections and display of satellite locations and an elevation mask. Antenna height may also be input by the operator. The keypad 482 in this example includes a full set of alphanumeric characters, function keys, mathematical operation keys, and arrow keys which may be used by the operator to indicate calibration adjustments, or alteration of virtual objects and information in the display 415. The ports 483 allow input of position data from the satellite receiver 476, input or output of database information to an office computer for those controllers which contain the display processor and database 450, and other connections which may be required in practice.

Figure 5A:
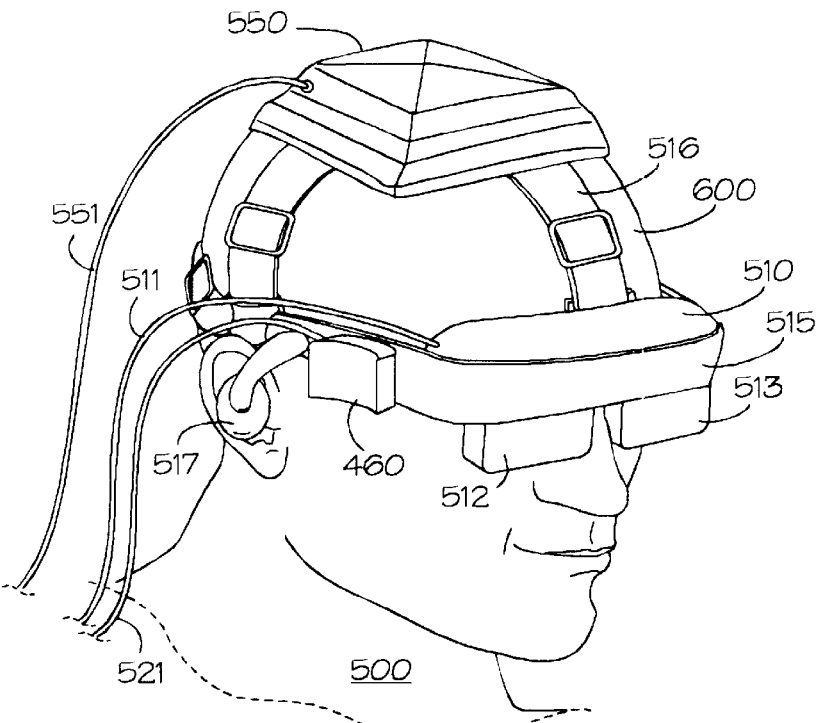
FIGS. 5a and 5b show alternative head position systems which may be used in the roving apparatus of FIG. 4b, FIGS. 6a and 6b indicate respective geometrical arrangements of the antennae and operator head locations for FIGS. 5a and 5b.
Figure 5B:
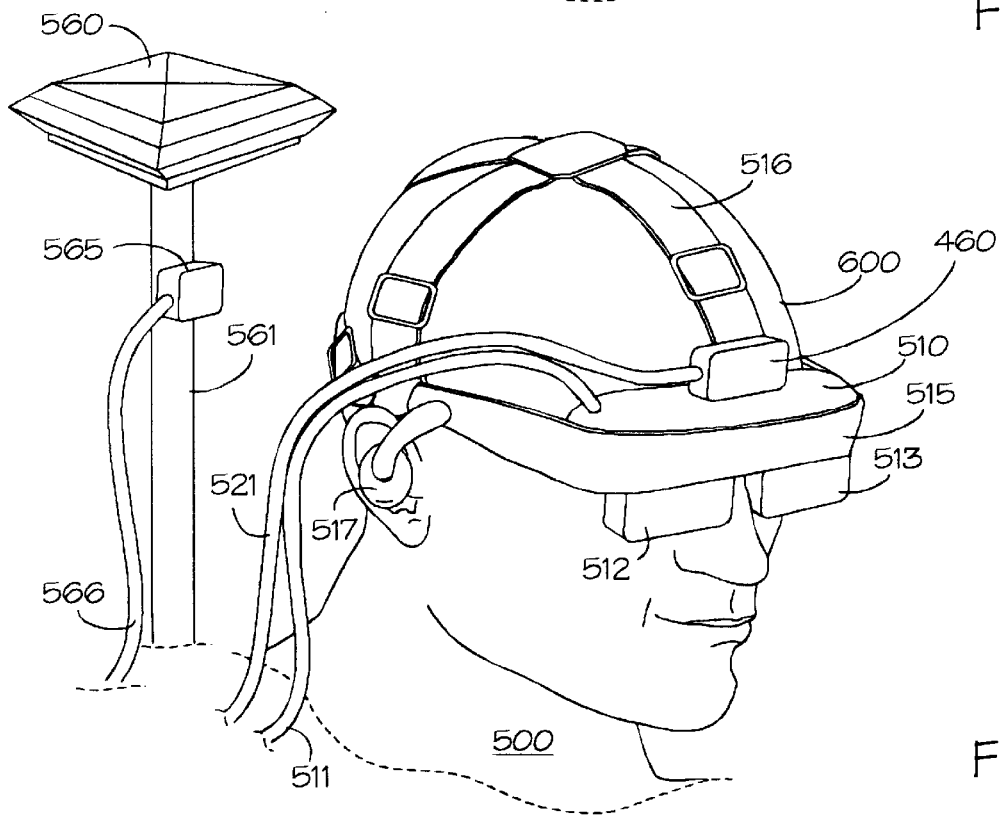

FIGS. 5a and 5b show alternative headset systems which may be worn by a survey operator 500 to provide augmented vision capability according to two embodiments of the invention. In each case the headset is based on general purpose head mounted display (HMD) equipment, such as that available from Virtual I/O Inc. and described in WO 95/21395 for example. A variety of different headsets could of course be used, or manufactured for this particular purpose, and much research has been carried out on HMD devices to date. A main component 510 of the headset contains electronics and optics required to produce a see-through image for each eye of the operator, given an appropriate input signal on cable 511. The function of this component and the nature of the input signals will be well known or readily determined by a skilled reader, such as through the specification mentioned above and references therein, so need not be described in detail. Optical combiners 512 and 513 include a transparent window having generally opaque support components which determine the field of view, although the operator may generally look downwards to avoid the window, and obtain a clear view of the controller for example. The window allows visible light from the environment to reach the eyes of the operator and provide natural images, while simultaneously presenting a generated image for each eye from the main component 510. Light reflected and received from real objects under observation by the operator is thereby combined with light generated by the main component to create virtual objects and related information superimposed on the operators' field of view. Optical combiners 512 and 513 can also be turned off to provide the operator with a clear field of view. The virtual objects are generally displayed in stereo by creating an image for each eye containing similar detail but from the slightly different perspective which results from separation of the eyes on the human head. This process will described further in relation to FIG. 8 below.

Other standard components of these headsets include a semi rigid frame 515, straps 516 which are adjustable to fit the head of a wearer comfortably and securely, earphones 517 which may provide sound to accompany the visual images presented on the combiners 512 and 513, a head orientation sensor 460, and a microphone if voice input is required. Various orientation sensors are available to assist with a head tracking function, including inertial, electromagnetic, Hall effect and flux gate devices, as mentioned in WO 95/21395. Their location on the operator's head is not critical, so long as the sensor is firmly fastened to the head, and they are shown with two different positions in FIGS. 5a and 5b. Each device provides an output signal on cable 521, containing yaw, pitch and roll information with reference to a coordinate system centered within. Devices which can produce angular measurements with an accuracy better than 0.1∞ as generally required in practice are commercially available. The function of a suitable head orientation component and the nature of the output signal will be well known or readily ascertained by a skilled reader from reference material provided with commercially available devices.

In the embodiment of FIG. 5a a satellite antenna 550 has been incorporated on the headset to determine operator head position using signals from a remote positioning system such as GPS. The antenna is an example of the antenna 455 in FIG. 4b which passes satellite signals along cable 551 to a receiver device which has not been shown. The head orientation sensor 460 is attached to frame 515 near the operator's right temple. In the embodiment of FIG. 5b a satellite antenna 560 is located at a distance from the operator's head, typically mounted on a pole 561 carried in a backpack such as shown in FIG. 1 This antenna generally requires a respective orientation sensor 565. Satellite signals from the antenna are passed along cable 562 and those from the additional sensor 565 along cable 566. The head orientation sensor 460 is attached to the main component 510 of the headset near the operator's forehead. In each figure there is a known geometrical relationship between the satellite antenna 550 or 560 and the operator's head as will be explained in relation to FIGS. 6a and 6b below. Head position and orientation information allow the position of each of the operator's eyes to be determined and thus the operator's field of view. An alternative arrangement which is not yet possible using currently available equipment involves three or more small satellite antennae attached to the headset to provide both head position and orientation data from the remote positioning system without need of the separate orientation sensor 460. While multiple antenna arrays of this kind are currently available they are not yet sufficiently small or lightweight to provide a workable system FIGS. 6a and 6b indicate simple mathematical models for calculating operator eye positions given head position and orientation information from the headset systems shown in FIGS. 5a and 5b respectively. This allows the rendering system 450 in FIG. 4a to determine a direction for the operator's instantaneous field of view F and therefore which virtual objects can be presented on the display 415. Some geometric information giving the position of each eye with respect to the antenna 550 or 560 is also required, stated as distances in three dimensions between the phase centre of the particular antenna and the centres of the operator's eyeballs. Forward, transverse and vertical distances with respect to the operator's head are designated as parameters x, y, z respectively and are added or subtracted from the antenna position by the rendering system as required. For accurate survey work the geometric information may be determined and input to the roving apparatus using individual characteristics of the particular operator, and in circumstances with less demanding requirements such as mapping or design checking, may be approximated by standard characteristics of a male or female head and neck. A dynamic calibration option will also normally be provided in which a selected virtual object in the display is aligned with a corresponding real object visible to the operator when the headset is initially placed on the head. Occasional calibration checks will also normally be performed by an operator at work to detect whether the headset has moved from the initial placement.

In the embodiment of FIGS. 5a and 6a the antenna 550 is located directly on top of the operator's simplified head 600 once the headset is put in place, and moves with the head as the operator looks in different directions. For an upright head the operator's field of view F may be taken as originating at a pair of eyeballs 601 positioned a distance x1 in front of, and z1 below the antenna position, separated sideways by a distance y1. These distances are assumed to be constant in the absence of any relative movement between the headset and head. Typical values for these parameters on a human head are x1=10 cm, y1=6 cm, z1=12 cm. For a head oriented away from upright by yaw, pitch and roll angles -y -p -r the actual distances between antenna and eyeballs are readily calculated by matrix multiplication as follows:

$$\begin{pmatrix} 1 & 0 & 0 \\ 0 & \cos\varphi_r & -\sin\varphi_r \\ 0 & \sin\varphi_r & \cos\varphi_r \end{pmatrix} \begin{pmatrix} \cos\varphi_p & -\sin\varphi_p & 0 \\ \sin\varphi_p & \cos\varphi_p & 0 \\ 0 & 0 & 1 \end{pmatrix} \begin{pmatrix} \cos\varphi_y & 0 & -\sin\varphi_y \\ 0 & 1 & 0 \\ \sin\varphi_y & 0 & \cos\varphi_y \end{pmatrix} \begin{pmatrix} x \\ y \\ z \end{pmatrix}$$

In the embodiment of FIGS. 5b and 6b the antenna 560 is located behind the operator's simplified head 600, mounted on pole 561, and does not generally move as the head turns to look in different directions. Calculating the operator eye positions from the antenna position in this case is a two step process of determining distances x2, y2, z2 from the antenna to a fixed point 602 at the top of the neck, about which the head is assumed to pivot, and distances x3, y1, z3 from point 602 to the eyeballs 601. Typical values for these parameters in relation to a human head are x2=20 cm, y2=0, z2=30 cm, x3=16 cm, z3=18 cm. However, the antenna will not necessarily remain upright, as the operator bends forward for example, or undergo the same changes of orientation as the operator's head. Both the head and antenna therefore require respective orientation sensors 460 and 565. The system of FIGS. 5b and 6b is more complex and prone to error than that of FIGS. 5a and 6a, as for example, the backpack which holds the antenna must be attached firmly to the operator so that distances x2, y2, z2 remain suitably constant. Whether or not a less preferred system in this form is used in practice will depend on whether the accuracy of alignment between real and virtual objects in the augmented display is acceptable under the circumstances.

Figure 7:
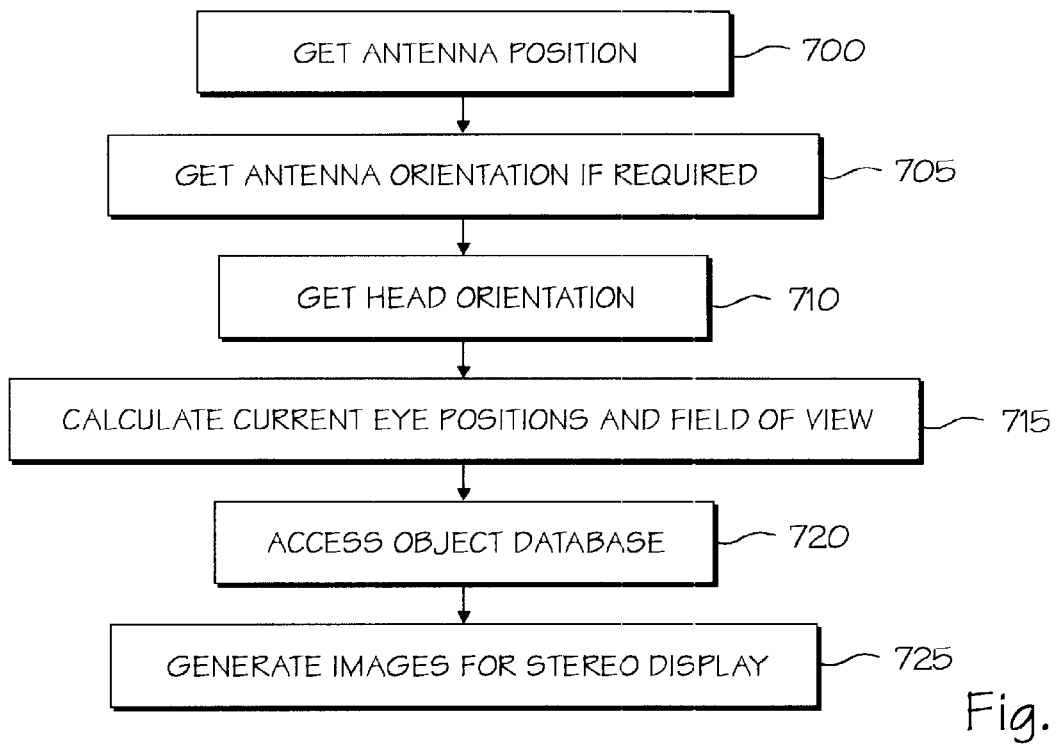
FIG. 7 is a flowchart indicating generally how a system such as shown in FIG. 4a creates an augmented field of view for the operator.

FIG. 7 is a flowchart which broadly outlines a routine which is continuously repeated by software in the rendering system 400 of FIG. 4a to create an augmented display 415 for the operator in real time. In step 700 the renderer first gets a current position measurement from the head position system 405, such as a measurement of antenna 455 generated by receiver 456 in FIG. 4b. The renderer may also require an orientation measurement for the antenna in step 705, such as a measurement from sensor 565 when the operator is using a system as shown in FIG. 5a. A measurement of operator head orientation is required from system 410 in step 710, such as output from sensor 460. In step 715 the renderer can then calculate operator eye positions and a field of view according to a geometrical arrangement of the antenna and head as shown in FIG. 6a or 6b. Information relating to the position, shape and attributes of virtual objects which are to be displayed is then obtained from database 420 in step 720. Finally an image is generated for each eye using the database information, and optional input from the operator as explained below, and passed to the headset 465 for display in step 725. More detail on this last step is given in relation to FIG. 9 below.

The latency or speed with which the display may be updated in this routine as the operator moves and looks about an environment is limited primarily by the speed and accuracy of head position measurement. Real time measurements accurate to about 1 cm can be obtained by available receiver equipment at a rate of about 1s each. Measurements accurate to only about 3 cm generally require less time and can currently be obtained in about 0.2s each. The operator may be required to be make more or less deliberate movements depending on the accuracy which is acceptable in particular circumstances. Predictive techniques may be used to reduce latency if required but are beyond the scope of this specification. Some discussion of systems for predicting head positions in advance is found in the article by Azuma and Bishop mentioned above. The degree of misregistration between virtual and real world objects depends on various factors, including the accuracy of contributing position and orientation measurements in FIG. 7 as mentioned above, and on the distance at which the virtual object must appear to lie. There are also usually errors in the headset optical systems. Misregistration is more or less tolerable depending on the operator's requirements.

Figure 8:
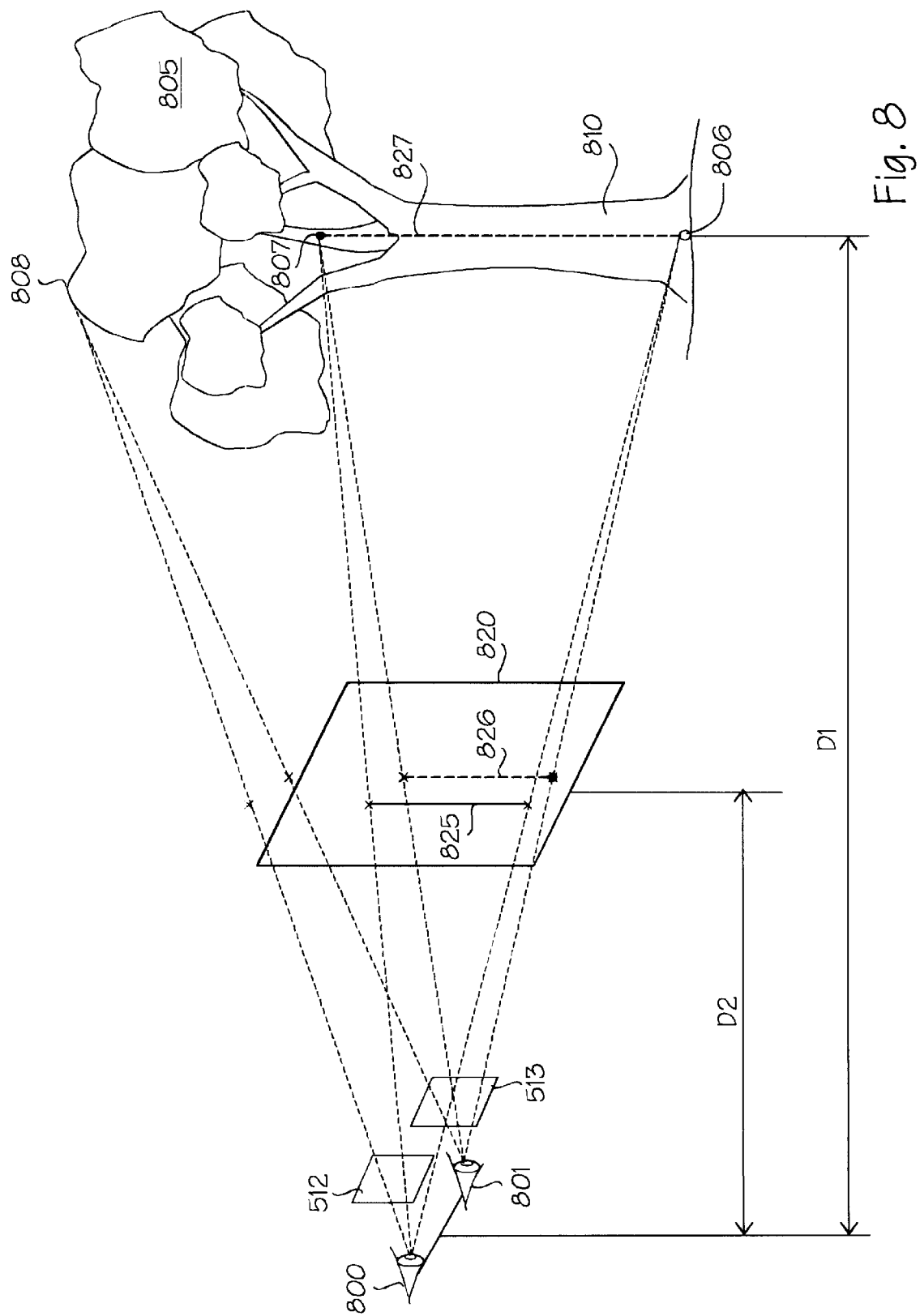
FIG. 8 shows geometrically how a virtual object may be aligned with a real world object to create the augmented field of view.

FIG. 8 is a diagram to illustrate simply how a virtual object is generated in stereo by the rendering system 400 in FIG. 4a, to correspond with a real object in the operator's field of view. In this example the operator's left and right eyes 800 and 801 are looking through semi transparent display devices, such as optical combiners 512 and 513 of a headset 465, towards a tree 805 at a distance D1. Information relating to the tree is stored in database 420, such as the actual position of two points 806 and 807 on trunk 810, connected by a dashed line, and a point 808 at the top of the tree. An attribute such as the type of tree may also be included. The renderer calculates left and right eye images on a plane area 820 at a prescribed distance D2, along respective lines of sight to the tree, as will be described in relation to FIG. 9 below. A calculation in this form is typically required by available headsets for processing and output of images on the combiners to create a stereo display. The images are shown generated as dashed lines 825 and 826, each aligned with trunk 810, to create a corresponding virtual object for the operator as a single dashed line 827 fully within the field of view. Simple images of this type are generally sufficient for most purposes, and other parts of a real object such as branches of the tree 805 may or may not be represented in the corresponding virtual object. Other significant points on the real object such as tree top 808 will in some cases be recorded in the database but lie outside the field of view, generally on a line which lies outside the plane area 820, and not capable of representation.

Figure 9:
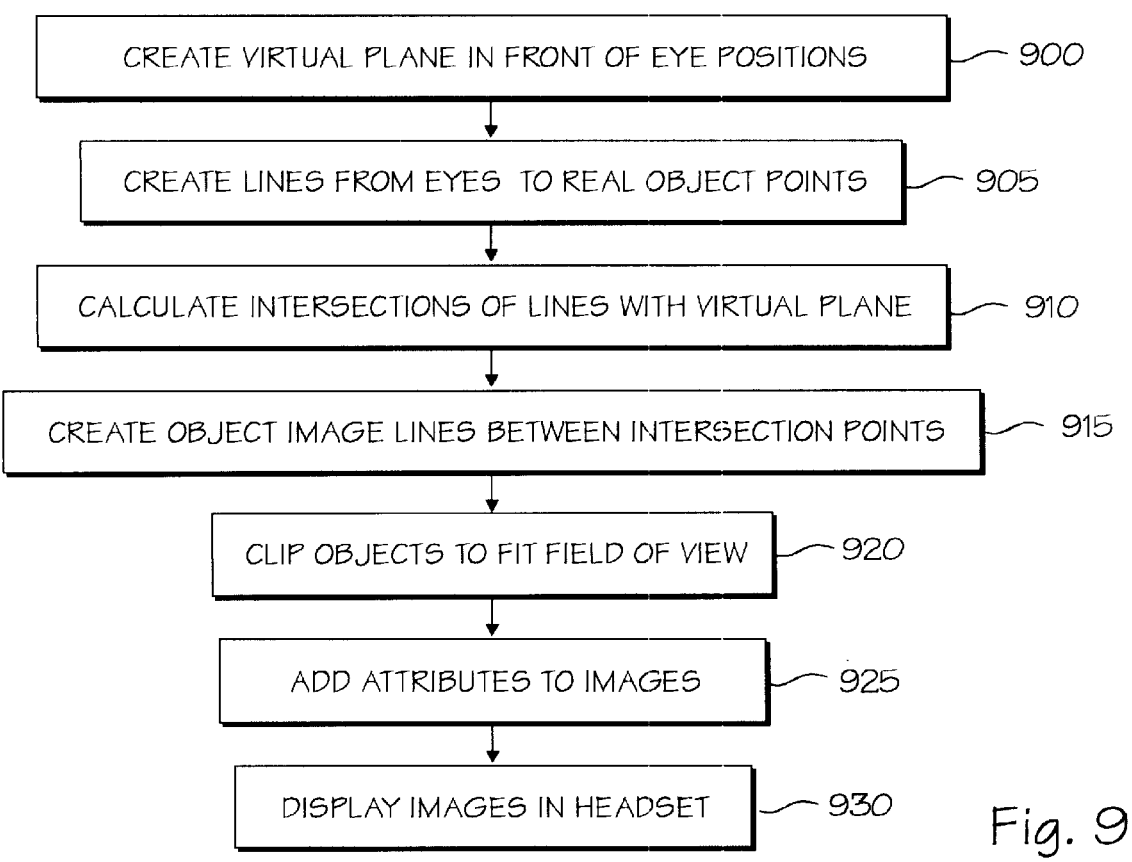
FIG. 9 is a flowchart indicating how images are calculated for each eye of an operator such as shown in FIG. 8 to create a stereo display.

FIG. 9 is a flowchart which broadly outlines a routine which may be implemented during step 725 of the routine in FIG. 7, to generate two images such as shown in FIG. 8. In step 900 the rendering system 400 determines the plane containing area 820 at a perpendicular distance D2 in front of the operator's eyes 800 and 801. The plane is characterized by an equation in a local coordinate system, generally the system to which the object position data is referred. This involves standard known mathematical operations which need not be described. In step 905 lines are determined joining the centre of each eye to each point on the real object which is recorded in the database 420, being lines to points 807, 806 and 808 at distance D1 in this example. The intersections of these lines with the plane are then calculated in step 910, indicated by crosses. Given the intersection points, step 915 then determines image points and lines, and other features for display, having characteristics which may be specified in the database, such as dashed lines 825 and 826. Any lines or points which lie outside area 820 are clipped in step 920, and any attribute information from the database is presented to fit on area 820 in step 925. Finally details of the image are passed to the headset 465 for display, and any further processing which may be required.

Figure 10:
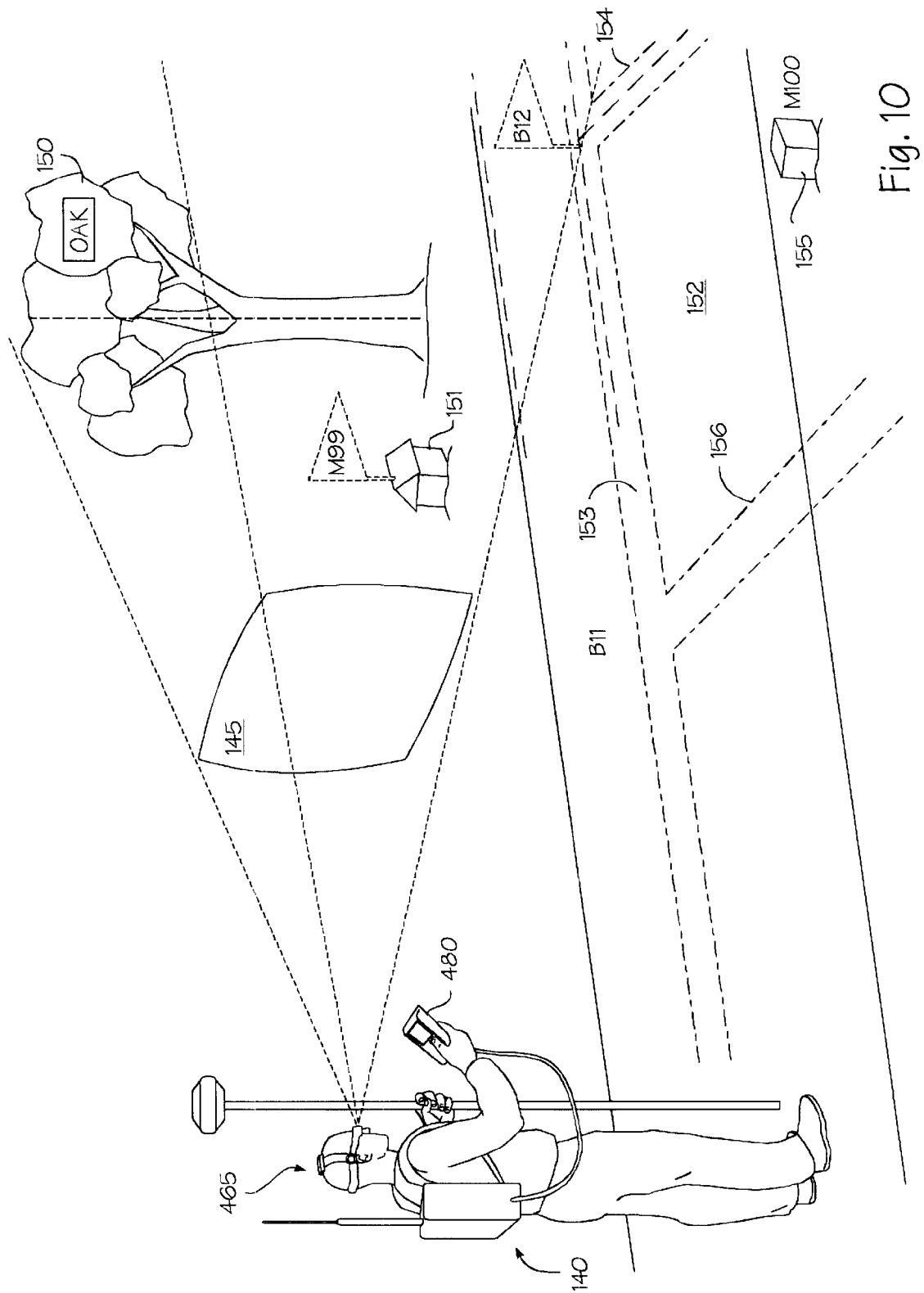
FIG. 10 shows a surveyor at work using apparatus according to the invention and indicates a visual observation which he or she might make of a site.

FIG. 10 shows a scene in which a survey operator 140 wearing roving apparatus according to the invention has a field of view 145 containing several real objects which have virtual counterparts. The field of view 145 is indicated as an approximately rectangular area roughly equivalent to area 820 in FIG. 8. This operator is wearing a headset 465 such as shown in FIG. 5a and carrying a satellite antenna 475 on a range pole for data acquisition which may be required on this site. A controller 480 is clipped to the pole. A small tree 150, survey monument 151, one edge of a concrete path 152, and part of an underground main 153 including a branch 154 are within the field of view. A corresponding virtual object is presented to the operator using stored image features and attributes, somewhat unrealistically in this figure for purposes of explanation, as only a single target object of interest to the work at hand would normally be presented at any one time. Another monument 155 and another branch 156 from the main are outside the field of view. The operator in this example could be doing any one of several things, such as checking whether tree 150 still exists, locating and checking the position of monument 151 which may not have been surveyed for many years, staking out additional points to determine the edge of path 152 more precisely, or placing a marker for a digging operation to repair branch 154 in the water main. In each case he must navigate to a target point on the site to take a position measurement or carry out some other activity.

Figure 11:
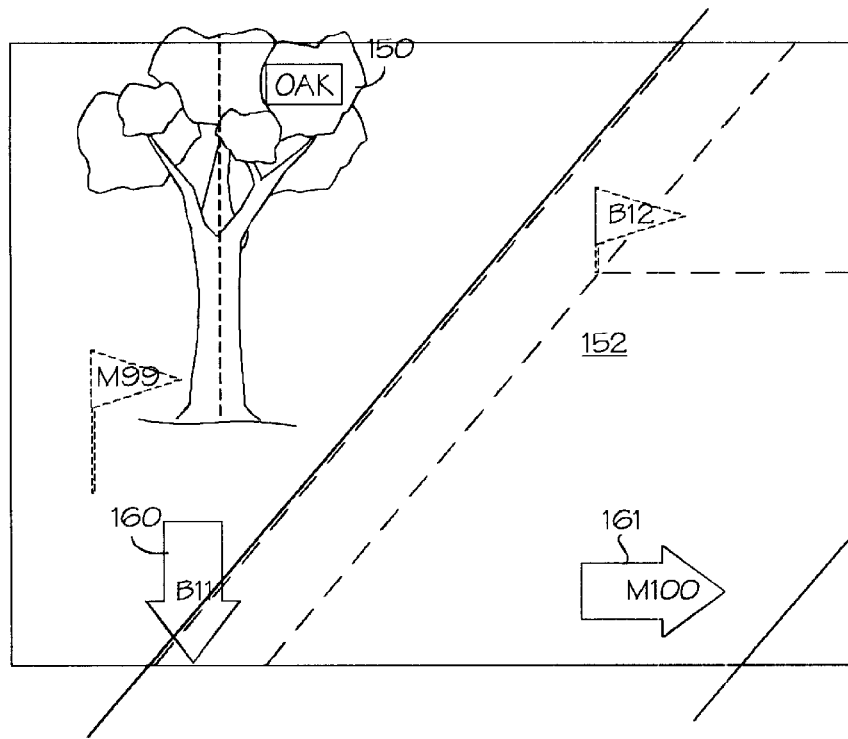
FIG. 11 shows a field of view such as indicated in FIG. 10 including navigation symbols as may be displayed for the operator.

FIG. 11 shows the augmented field of view 145 as might be observed by the operator 140 in FIG. 10, once again including more target objects than would normally occur in practice. In this example the position of monument 151, which is recorded in the object database with a code "P99", is shown marked by a virtual flag, although the monument itself is missing and will need to be replaced by the operator. The underground main 153 cannot be seen although target branch 154 coded "B12" can be located and marked. Navigation symbols 160 and 161 are presented in the display to indicate the positions of monument 155 and branch 156 recorded as "P100" and "B11" respectively. They indicate to the operator a direction in which to look or walk in order to locate the real object targets, without needing to determine a compass direction, as will be evident. The symbols may take various colors or flash if required. It is assumed here that the operator has an interest in each of the real objects which have been shown, and has caused the display of a corresponding virtual object or navigation symbol in each case. In general however, the display would be considerably simpler if the operator was concerned with a single object. The work of operator 140 in FIGS. 10 and 11 may be regarded as generally comparable to the operators in FIG. 3a such as operator 323.

Figure 12:
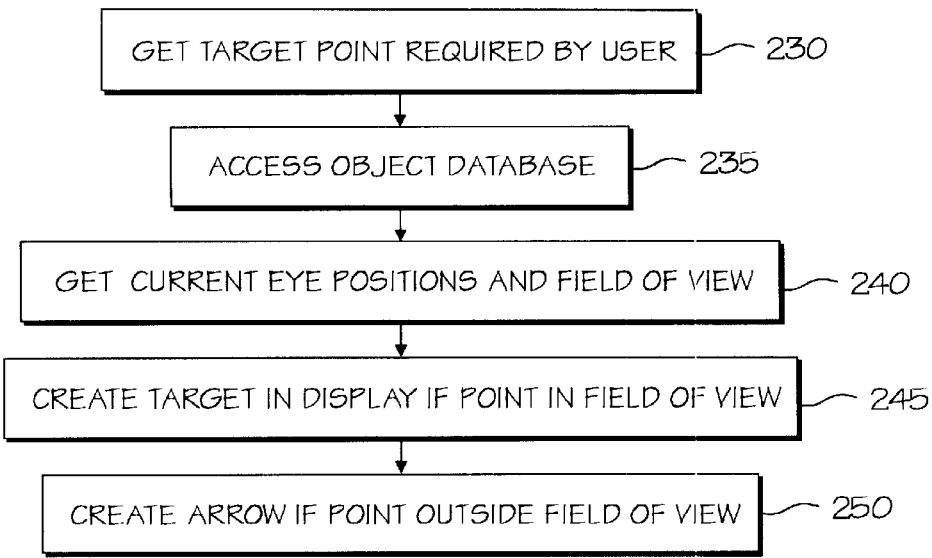
FIG. 12 is a flowchart indicating how the apparatus of FIG. 4a generates a display of navigation information for the operator.

FIG. 12 is a flowchart which indicates how the rendering system 400 in FIG. 4a generates navigation symbols in the display on request by the operator, such as those shown in FIG. 11. The operator first indicates a target point of interest, typically through the controller 480 in FIG. 4b by entering a code such as "P100". In step 230 the rendering system 400 receives this code from the controller, and obtains information regarding the target point from the object database 420 in step 235. The renderer must then determine the current field of view as in FIG. 7, and in step 240 obtains the operator head position and orientation from systems 405 and 410 to carry out the calculation. If the target point is already within the field of view a virtual object is created and displayed in step 245. Otherwise in step 250 the renderer determines whether the target is up, down, right or left from the field of view and creates an navigation symbol in the display indicating which direction the operator should turn, typically in the form of an arrow. The routine continues to determine the current field of view and either present a virtual object corresponding to the target in step 245 or update the navigation symbol until halted by the operator. Other navigation information may also be presented such as distance and bearing to the particular real object to which the operator is seeking to move.

Figure 13:
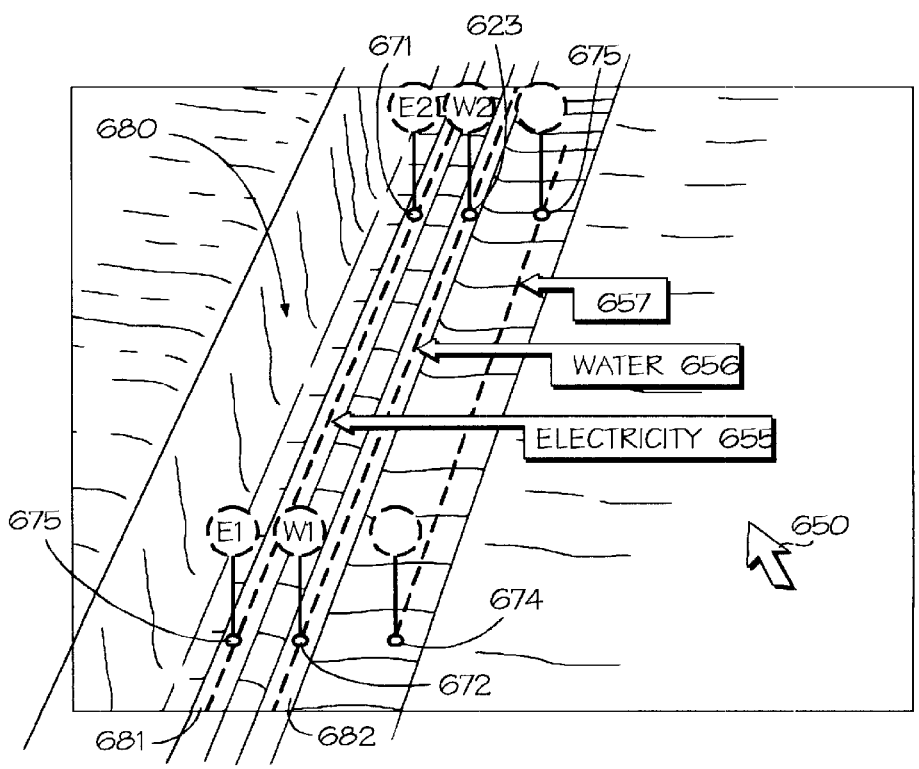
FIG. 13 shows a field of view containing new features and attribute information which the operator has input using the real controller device.

FIG. 13 shows another augmented field of view of somewhat idealized work in progress, which might be seen by an operator using roving apparatus according to the invention. This example demonstrates input of information by the operator using a virtual cursor 650 which could take many shapes. The operator is observing a ditch 680 dug by an excavator to reveal an electricity cable 681 and a water main 682, in a similar context to operator 365 in FIG. 3b. Points at various positions along the cable and water pipe have been surveyed in earlier work and are already in he database with code and attribute information. Virtual objects corresponding to these real and visible objects are indicated as dashed lines 655 and 656 respectively, with an appropriate attribute "ELECTRICITY" or "WATER". Points 670, 671 on the cable and within the field of view are indicated by virtual markers coded "E1", "E2" and could represent power feeds which have not been shown. Points 672, 673 on the water main are similarly indicated by virtual markers coded "W1", "W2". A gas main is to be laid parallel to the existing features and the operator has determined the position of two further points 674, 675 at which a gas pipe will be placed. Virtual prompt markers are shown at these points and the operator may now use the controller 480 in FIG. 4b to move the cursor 650 to separately select the markers for input of respective codes, such as "G1" and "G2". The operator has already created a dashed line 657 between points 674, 675 as a virtual object representing the gas pipe. An attribute for the object may now be input as also prompted, predictably "GAS".

FIG. 14 is a software flowchart indicating for input of database information using a virtual cursor such as shown in FIG. 13. The operator first selects an input option on the controller 480 such as shown on screen 481 in FIG. 4c. The rendering system 400 then calculates the field of view in step 750 as previously described. A virtual cursor is created in the display at a start position such as the lower right corner of FIG. 13, by step 755. Operator input at the controller through the arrow keys on keypad 482, indicates incremental shifts for the cursor in the display in a loop formed by steps 760, 762 and 764. An equivalent effect could be produced by holding the cursor at a fixed location in the display and having the operator make head movements to vary the field of view. After moving the cursor on the display the operator may select a desired item in step 764, such as one of the prompts in FIG. 13, or an existing attribute for alteration. An option to create a virtual object such as a dashed line between existing points is also provided and may be selected by appropriate positioning of the cursor and button on the controller. An option to delete items is similarly provided. The renderer then waits for an input from the controller keypad in step 770, and presents the input in the display for viewing in step 775. Once satisfied with the input which has been presented or any changes which have been made the operator may store the new information in database 420 as required in step 780. The cursor is removed when the routine is halted by the operator.

A data acquisition system 425 for the preferred roving apparatus shown in FIGS. 4a and 4b can be implemented in several ways depending on the accuracy of position measurements which are required. An operator can collect position information at points of interest in conventional ways as mentioned in relation to FIG. 1, using either the physical range pole 475, antenna 474, and receiver 476, similarly to operator 110, or using the head position antenna 455 and receiver 456, similarly to operator 100 and with generally less accurate results. Either kinematic or differential techniques may be used, and because the rendering system 400 requires real time measurements from the head position system 405 to generate the augmented display 415, data acquisition also produces real time position coordinates rather than raw data for post processing later. The present invention enables information to be collected using either of these arrangements in real time with an optional measurement indicator presented as a virtual object in the display 415, as will now be described.

Figure 15:
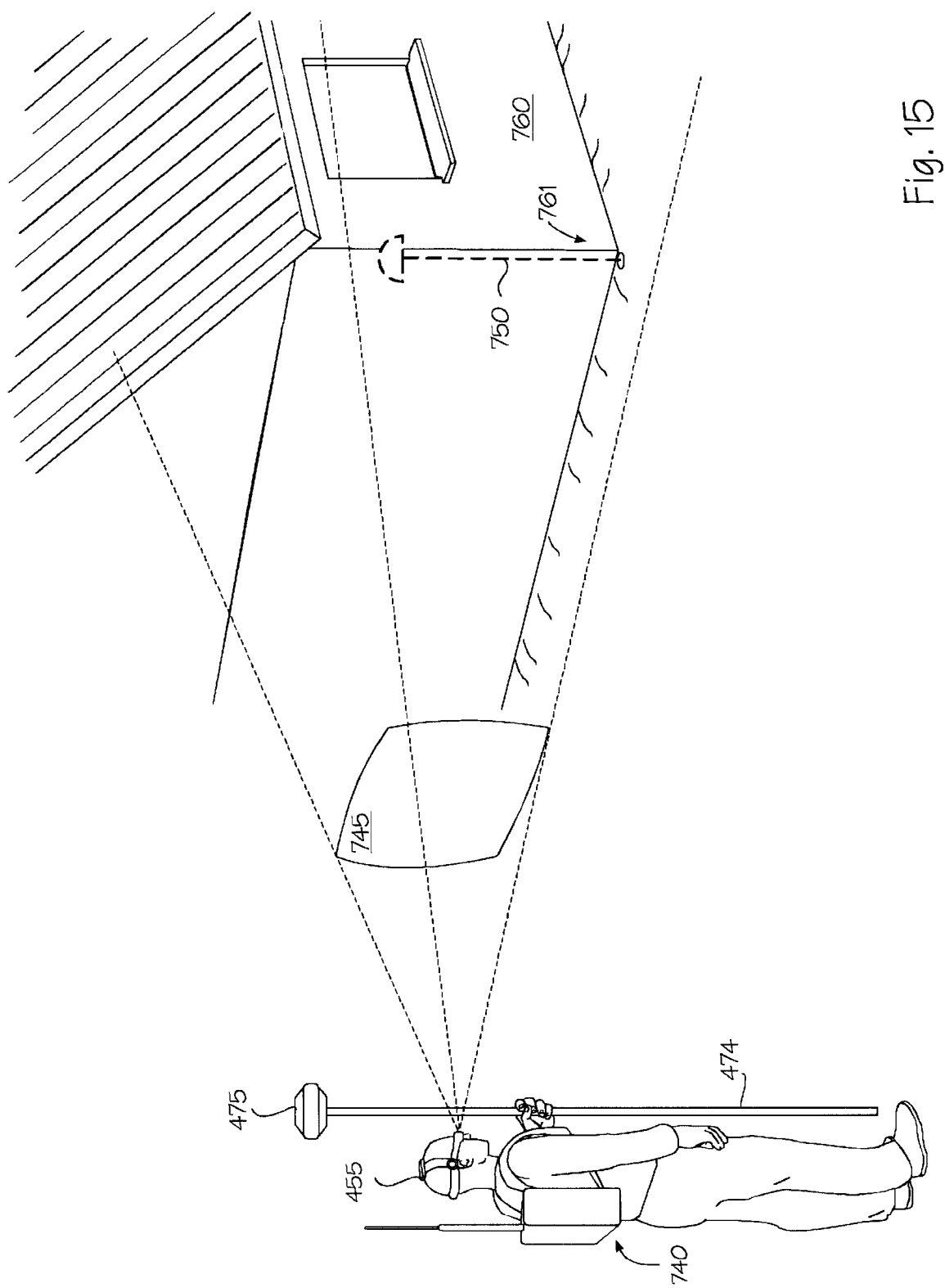
FIG. 15 shows a survey operator at work using roving apparatus according to the invention to measure the position of a ground point using a virtual range pole.

FIG. 15 shows a scene in which a survey operator 740 is measuring the position of point 760 at one corner 761 of a house 762 using one embodiment of the roving apparatus according to the invention. The field of view 745 is indicated as an approximately rectangular area roughly equivalent to area 820 in FIG. 8. This operator is wearing a headset 465 with antenna 455 such as shown in FIG. 5a, and carrying a satellite antenna 475 on a range pole 474 for the data acquisition system 425 in FIG. 4a. It is not possible to place the range pole exactly at the corner 761 and directly take a useful measurement of point 760 for several general reasons which arise from time to time in survey activities. In this case the physical size of the antenna prevents the range pole from being oriented vertically over the point of interest, and the house structure prevents the antenna from receiving a sufficient number of satellite signals. The house structure may also generate multipath reflection signals from those satellites which do remain visible to the antenna. Practical problems involving physical inaccessibility or lack of signal availability such as these are normally solved by measuring the position of one or more suitable nearby points and calculating an offset. The operator here makes use of a virtual range pole or measurement indicator 750 which may be created anywhere in the field of view by the rendering system 400 in FIG. 4a. This virtual object is shown in dashed form as a semi circular element on top of a vertical line which resemble the antenna 475 and pole 474, although an indicator could be presented in various ways such as a simple arrow or flashing spot.

The position of virtual pole 750 is determined as an offset from that of antenna 475 or antenna 455 in the system of FIG. 5a or 5b respectively. The position of virtual pole 750 and its appearance in the field of view may be adjusted as required by the operator. Antenna 475 is generally to be preferred because the operator can more readily hold pole 474 steady for a few seconds or more as required to make an accurate measurement using currently available receiver equipment.

Antenna 474 moves with the operator, and particularly in the system of FIG. 5a moves with the operator's head, so is less likely to remain steady for the required interval and will generally produce a less accurate position measurement. The operator may look downwards at a controller 480 for example. However, either arrangement may be used in practice depending on the level of accuracy required in the work being carried out by the operator. Accuracy also depends on correct calibration in the alignment of virtual and real objects, and the distance at which a measurement using the virtual pole is sought. Submeter accuracy is generally possible using a virtual pole offset by up to around 5 m from antenna 475 carried separately on a real range pole. Improvement in the speed of available equipment is expected to improve the acceptability of measurements made using antenna 455.

Figure 16:
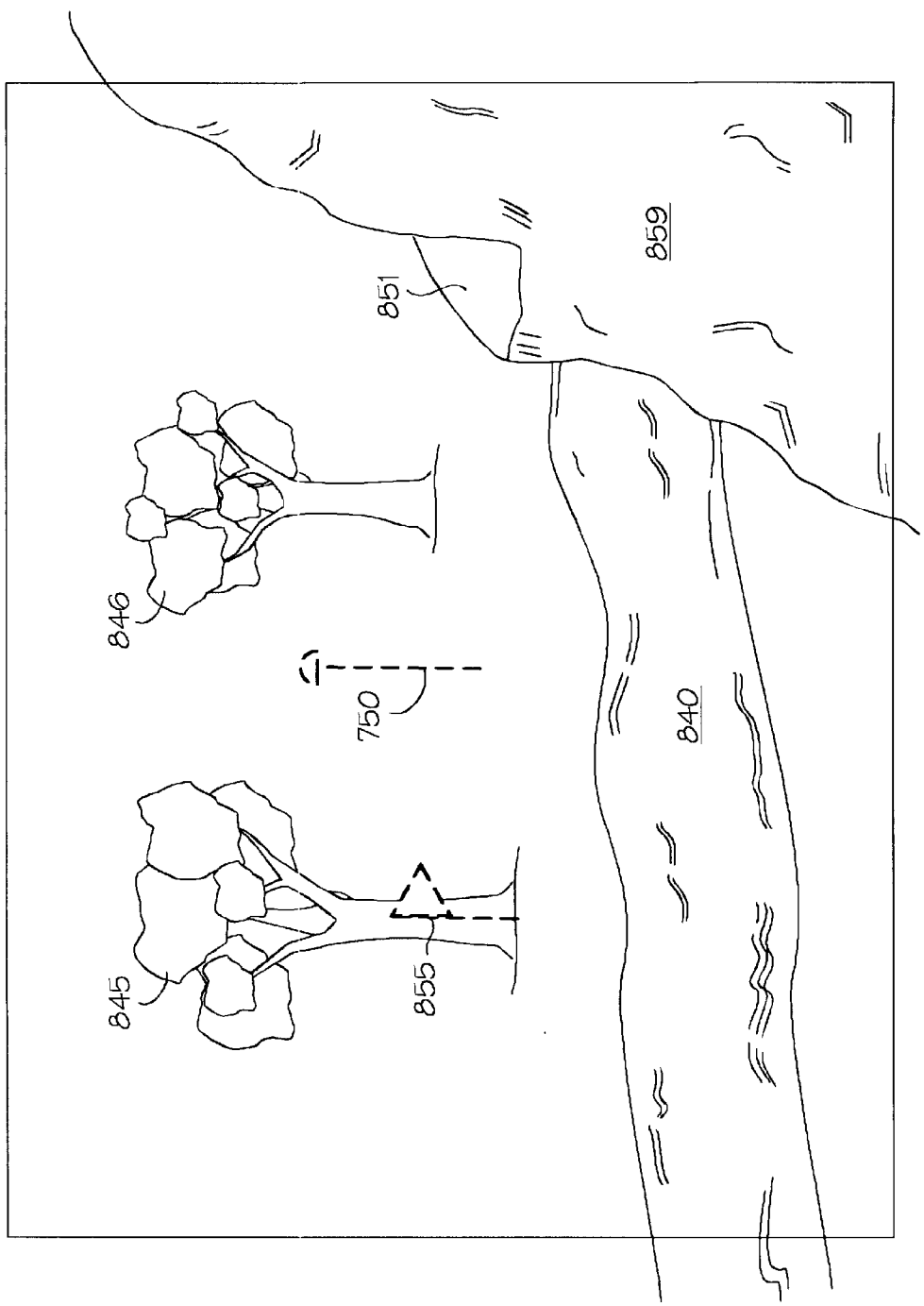
FIG. 16 shows an augmented field of view containing a virtual range pole being used to collect position data at inaccessible points.

FIG. 16 shows an augmented field of view containing a virtual range pole 750 as might be used by an operator to record position information at one or more inaccessible points according to the invention. In this example the operator is standing on one side of a river 840 measuring the positions of two trees 845 and 846 on the other side, and also the height of a ledge 851 on a nearby bluff 850. A position has already been measured for tree 845 and stored in the database 420 along with a corresponding virtual object which now appears as dashed line 855. The virtual range pole is shown approximately centered in the field of view and may be moved to tree 846 or the ledge 851 by the operator using controller 480, or a virtual controller as will be described below in relation to FIG. 18. Should the operator choose to look elsewhere in the environment during this process the pole may fall outside the field of view and will disappear from the display. On looking back across the river the virtual pole returns at one or other side of the display. Alternatively a reset function on the controller could be used to replace the pole in a central position in the field of view.

Figure 17:
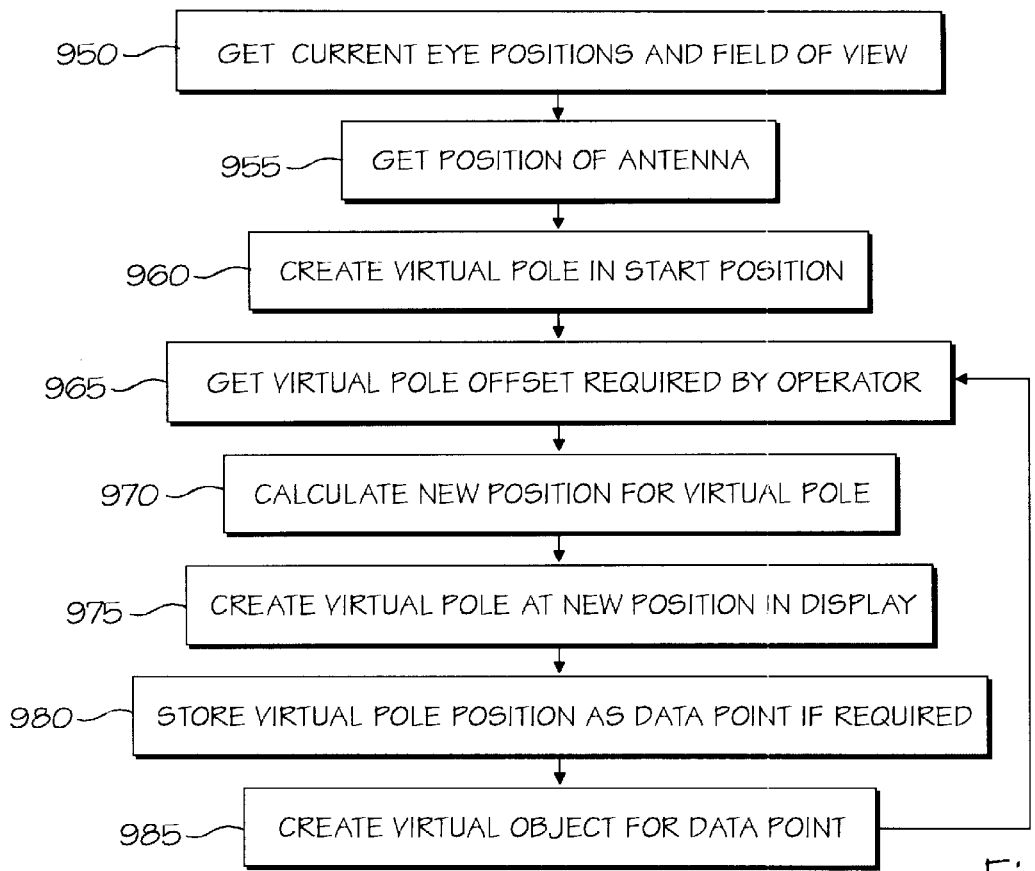
FIG. 17 is a flowchart indicating how a the preferred roving apparatus obtains position data using a virtual range pole such as shown in FIG. 16.
Figure 18:
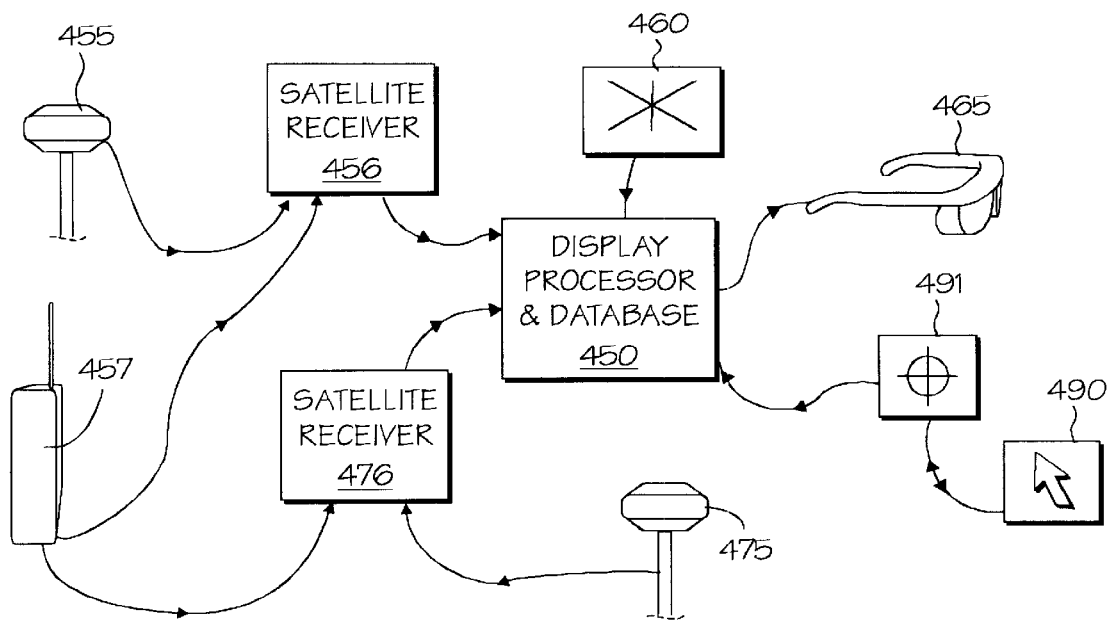
FIG. 18 shows apparatus including alternative roving apparatus in which a virtual interface may be provided for the operator.

FIG. 17 is a flowchart indicating a routine by which the rendering system 400 may enable position measurements to be recorded using a virtual range pole such as shown in FIG. 15. The operator first selects data acquisition as an option on the controller 480 as shown in FIG. 4c. Rendering system 400 then calculates the field of view in step 950 as previously described. The current position of antenna 455 or 475 is obtained in step 955. A virtual pole is then created at a start position such as the centre of the display in FIG. 15, by step 960. Operator input at the controller indicates incremental offsets for the pole, and eventually stores a position measurement in database 420 in a loop formed by steps 965 to 985. In step 965 the renderer waits until the operator indicates an offset, such as through the arrow keys on keypad 482, and then calculates the new pole position in step 970. The pole can then be recreated in the display at the new position in step 975. Each push of an arrow key moves the pole a fixed angular distance in the field of view for example, and holding the key down causes the pole to move continuously. The operator indicates through the controller in step 980 when the position of the virtual pole is to be stored as a point in the database, or may otherwise terminate the routine to remove the pole from the display. On storing a new point the renderer may also create a virtual object in the database such as flag 855 in FIG. 15 and present the object in the display as confirmation that the measurement has taken place. FIG. 18 shows the apparatus of FIG. 4b in which controller 480 has been optionally replaced by pointing and sensing devices 490 and 491 which may be used with the headset 465 to provide an alternative interface for the operator. A variety of pointing and sensing systems are known, such as the glove system described in U.S. Pat. No. 4,988,981 produced by VPL Research Inc., and need not be described in detail. Another possible pointing device is a pen or wand as known from virtual reality technology. The operator wears or carries the pointing device 490 with one hand and the display processor 450 produces a virtual control object in the field of view which resembles or is equivalent to the controller 480, as described in relation to FIG. 19. The pointing device has an indicating component such a finger tip on the glove, or the pen tip, which the operator sights through the headset and aligns with desired inputs on the virtual control object. The sensing or tracking device 491 may be located on the headset 465 or elsewhere on the operator such as on a belt. It continuously determines the position of the indicating component and thereby any inputs required by the operator.

Various methods may be used to sense the position of the pointing device and the indicating component in front of the headset. One preferred method makes use of a Polhemus 3D tracking system such as that available under the trademark 3SPACE INSIDETRAK. According to this method the tracking device 491 includes a small transmitter that emits magnetic fields to provide a reference frame. The pointing device includes a small receiver that detects the fields emitted by the transmitter and sends information to a processor system for analysis. The processor system calculates the position and orientation of the receiver and thereby the pointing device.

Figure 19:
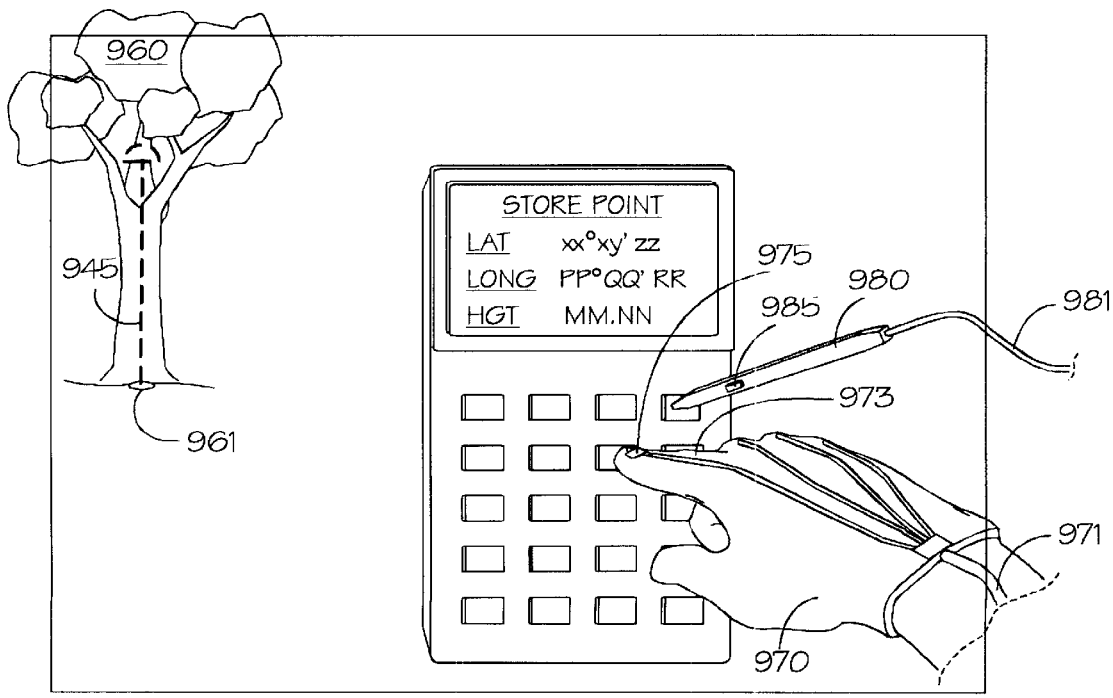
FIG. 19 shows an augmented field of view containing a virtual interface and alternative pointing devices.

FIG. 19 shows an augmented field of view containing a virtual control object 940 and alternative pointing devices which might be used with roving apparatus according to the invention. In this example the operator is using a virtual range pole 945 as described above in relation to FIG. 15 to measure the position of point 961 at the base of a tree 960. Control object 940 is created by the rendering system 400 to resemble controller 480 in FIG. 4c although many features of the keypad 482 have been omitted here for clarity. The pole has been offset to the tree position and the operator may now indicate that a position measurement as shown in the screen 481 be stored. One alternative pointing device is a glove 970 having a Polhemus receiver 975 located on the index finger 973. Another possible pointing device is pen 980 having a Polhemus receiver 985. Information from the receiver 975 or 985 is passed from each pointing device along respective cables 971 and 981. The tips of the index finger and the pen are indicating components which the operator positions at appropriate keys of the virtual control object for a predetermined length of time to select a desired input for the rendering system. A push button on the pointing device may also indicate when an input is to be made. Confirmation that the input has been successfully input may be provided as an indication on screen 481 or by highlighting the key on keypad 482 which has been selected.

Figure 20:
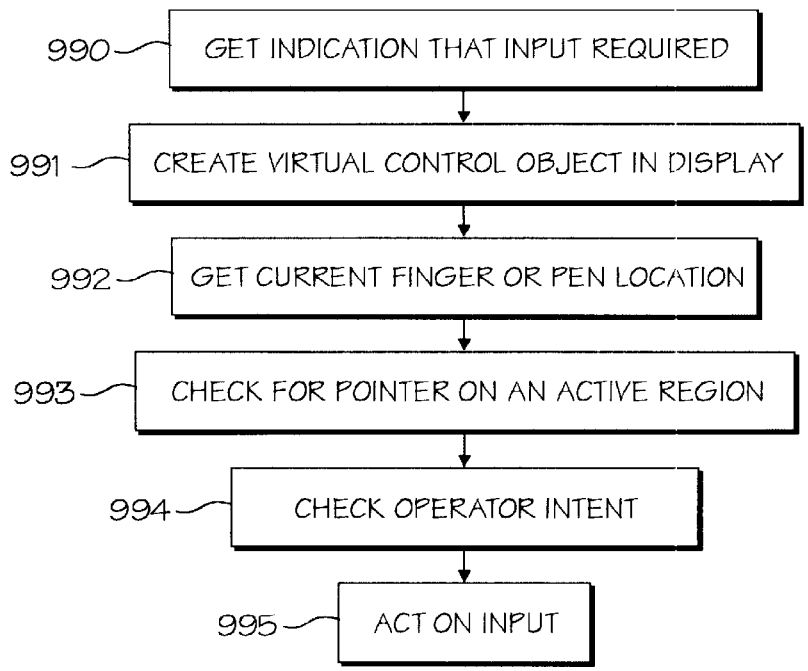
FIG. 20 is a flowchart indicating how the apparatus of FIG. 18 may receive input from an operator using a virtual interface.

FIG. 20 is a flowchart outlining broadly a routine by which the rendering system 400 may provide an interface for the operator through a virtual control object such as shown in FIG. 19. The operator first indicates to the renderer in step 990 that the control object should be created in the display, through a push button on the pointing device for example. This could also be achieved by simply raising the pointing device 490 into the field of view. The control object is then created in step 991 and the position of the indicating component of the pointing device is monitored for acceptable input in a loop formed by steps 992, 993 and 994. In step 992 the renderer receives the position of the indicating component from the sensing device 491. This position in relation to the headset or to a belt system is converted to a position on area 820 in FIG. 8 and compared with those of a set of active regions on the control object, such as the keys in step 993. If an active region has been indicated the renderer then highlights the region and checks that the indicating component is held in place by the operator for a minimum period of time in step 994, typically about one second. Other methods of checking the operator's intent regarding input at a particular region, such as detecting gestures may also be used. Finally in step 995 the renderer acts on the acceptable input and may provide confirmation in the display that a corresponding event has taken place.

Figure 21:
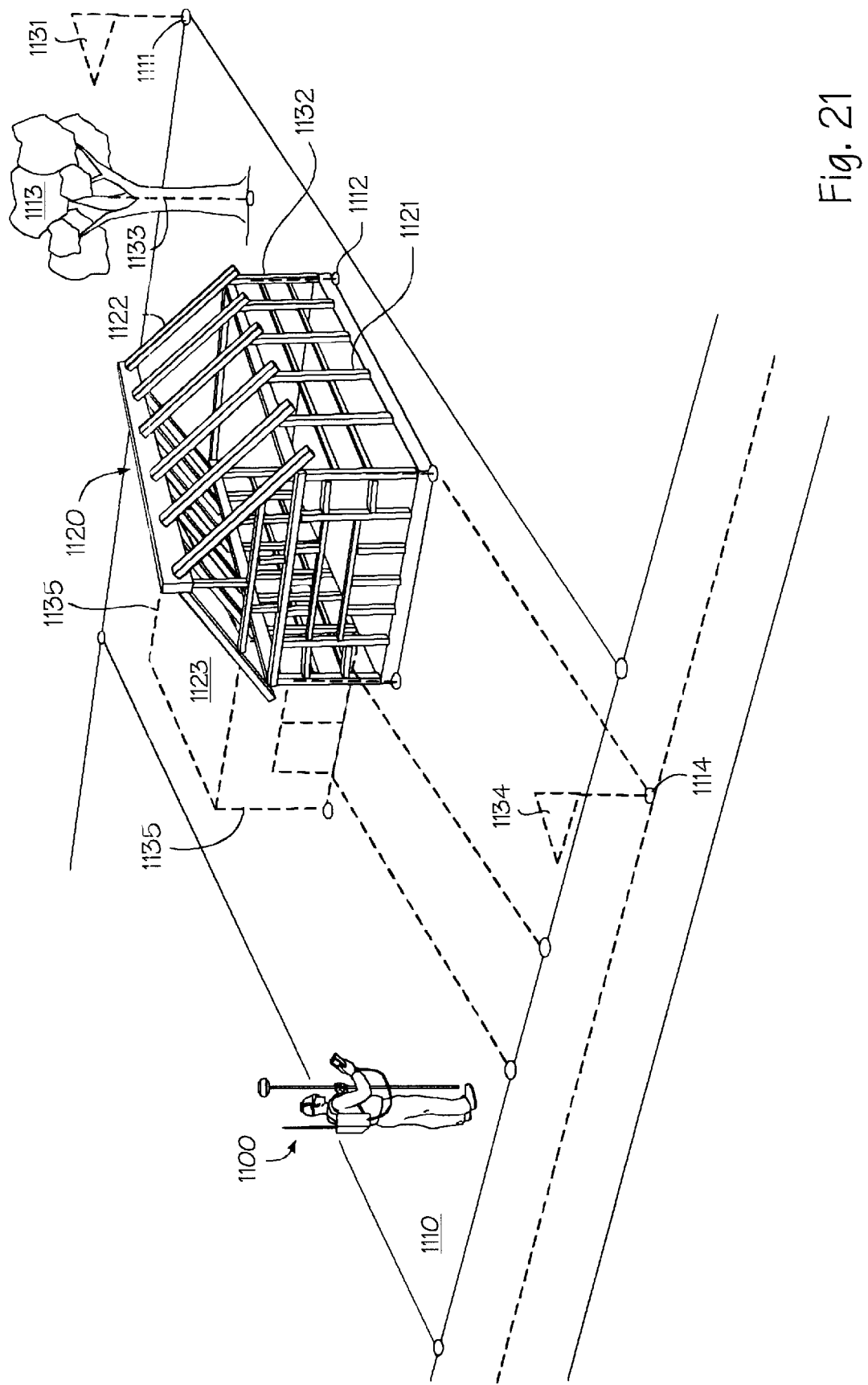
FIG. 21 shows an operator at work on a building site checking the design of a half finished structure.

FIG. 21 shows a scene in which an operator 1100 is working on a site 1110 inspecting construction of a building 1120 using roving apparatus according to the invention. In this example the building is a house and garage, although structures of all kinds, including civil, commercial, industrial and other designs as generalized above may be visualized. The operator is not necessarily a surveyor but could be a builder or engineer for example. Various points on the site have been surveyed in previous work and included in an object database which forms part of the roving apparatus. These points include monuments 1111, corners of the foundation 1112, a tree 1113 and a branch 1114 for an underground utility service such as electricity or water. Parts of the building such as some wall and roof structures 1121 and 1122 of the living area are already partially completed. Construction is yet to begin on other parts such as a garage 1123. Virtual objects 1131, 1132, 1133 and 1134 indicating the positions of the monuments, foundation corners, the tree and utility branch are also included in the database and are presented to the operator as they fall within the field of view. A collection of virtual objects 1135 are included to represent the walls, roof and other features of garage 1123. In general, there will be a range of features of the design contained in the object database, including points, lines, surfaces and various attributes such as those discussed in relation to preceding figures. The operator's inspection of site 1110 and the building under construction is thereby enhanced by an augmented view of some or all parts of the structure. Those parts which are partially completed can be checked for accuracy of workmanship. The corners of walls 1121 must align with virtual objects 1132 for example. Those parts such which have not yet been started can be readily visualized. An outline of the garage 1123 can be seen in a finished form for example. New survey points for additional structures or corrections can be added to the database during the inspection if required, using methods as described above.

Figure 22:
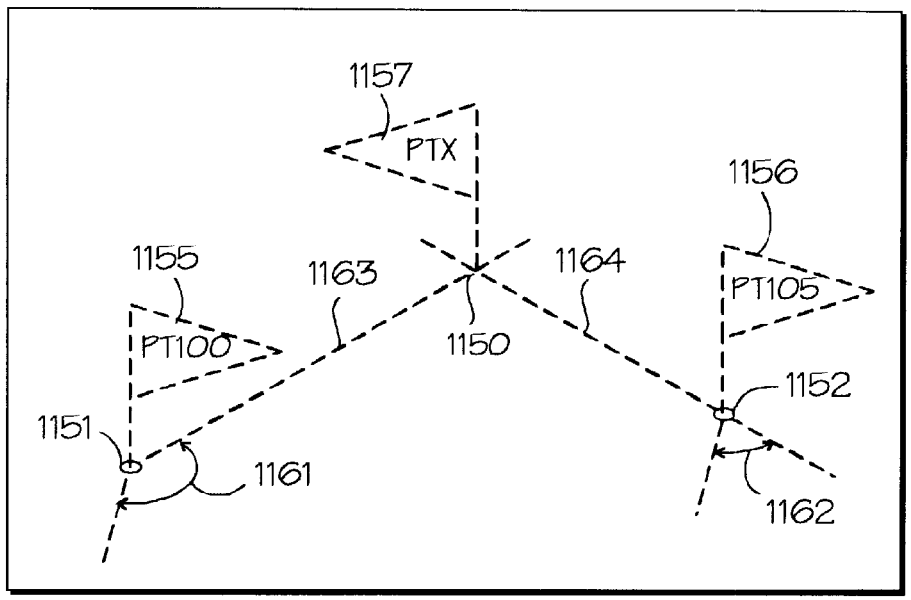
FIG. 22 shows an augmented field of view in which an intersection function has been employed to calculate and display a result point.

FIG. 22 shows an augmented field of view presenting the result of a survey calculation which might have been required on site, by operator 140 in FIG. 10 or operator 1100 in FIG. 21 for example. This optional function of the apparatus produces the position of an unknown intersection point 1150 determined by two known points 1151 and 1152, and respective bearings or azimuths 1161 and 1162 from the known points. All three points are shown in the field of view for purposes of explanation, although in practice they may be further apart so that only one can be viewed at any time. Each of the known points 1151 and 1152 are either already stored in the object database 420, perhaps as the result of earlier calculations, or are measured using data acquisition system 425 when required by the operator. The bearings are typically entered through interface 417 when required, as will be described below. The calculation can be presented to the operator in various ways using virtual objects such as those shown. In this case the known points 1151 and 1152 are displayed as flags 1155 and 1156 carrying their database codes "PT100" and "PT105" while the unknown point 1150 is displayed as a flag 1157 coded as "PTX". A numerical code is allocated to the unknown point when stored in the database by the operator. Line objects 1163 and 1164 are optionally displayed according to the required bearings 1161 and 1162 input by the operator. Numerical information stating the coordinates and bearings, for example, may also be presented in the field of view, although this may be avoided to ensure clarity for the operator.

Figure 23A:
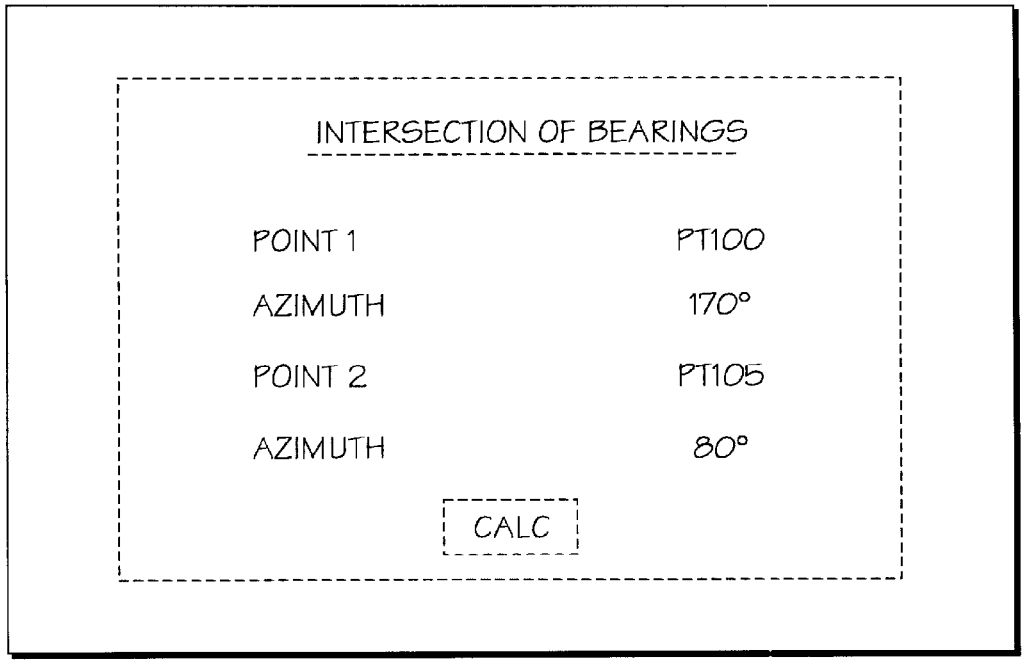
FIGS. 23a and 23b are augmented fields of view demonstrating entry of detail using a virtual interface.
Figure 23B:
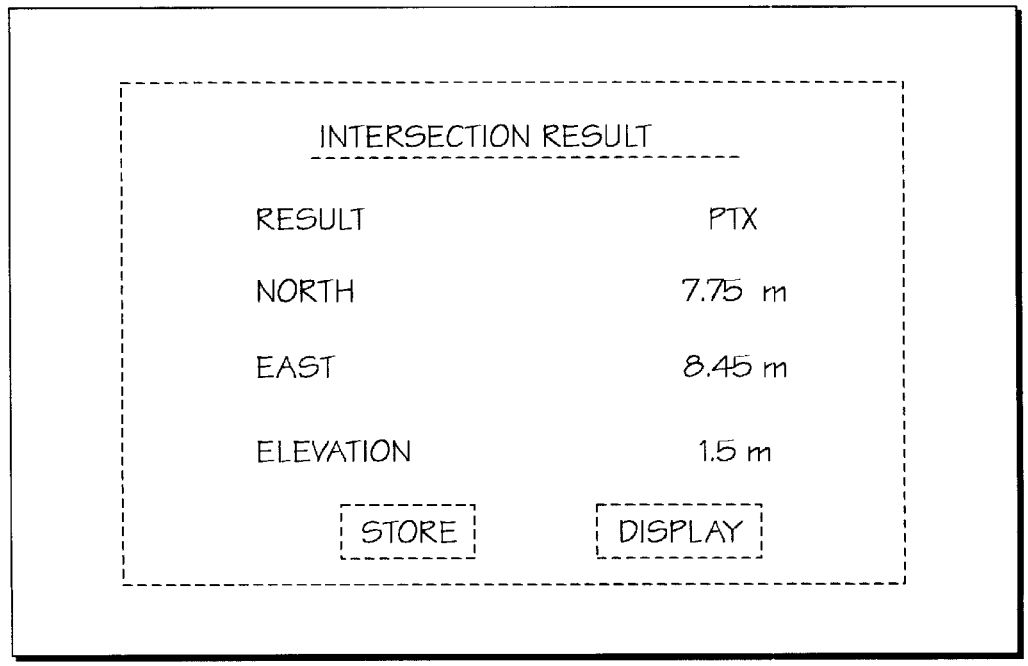

FIGS. 23a and 23b indicate how known points 1151 and 1152 and bearings 1161 and 1162 may be selected or input by an operator to form the basis of a calculation such as presented in FIG. 22. The example calculation is once again an intersection of two lines determined by two points and two bearings, sometimes referred to as "intersection of bearings", by way of example. Intersection of two circles or a line and a circle are other possibilities, and other functions such as calculation of offsets or inverses would also normally be provided. Some intersection functions such as that of a line and a circle, produce two possible resulting points. The operator is able to select either in the field of view arising a virtual cursor. FIG. 23a shows a data input screen of the operator interface 417 which may be presented on manual controller, such as controller 481 in FIG. 4c, or on a virtual controller such as shown in FIG. 19. A virtual data input screen is shown in this example. The operator has specified known points coded "PT100" and "PT105" as inputs "point 1" and "point 2" required by the screen, and has input bearings "170∞" and "70∞" respectively to determine the intersection. Selecting "CALC" produces a result screen as shown in FIG. 23b. The operator is now presented with northing, easting and elevation distances relative to his present position for the intersection point "PTX". The new point could also be presented as a distance and bearing from the present position. Selecting "STORE" stores the point in the database with an appropriate code. Selecting "DISPLAY" presents a view such as that shown in FIG. 22.

Figure 24:
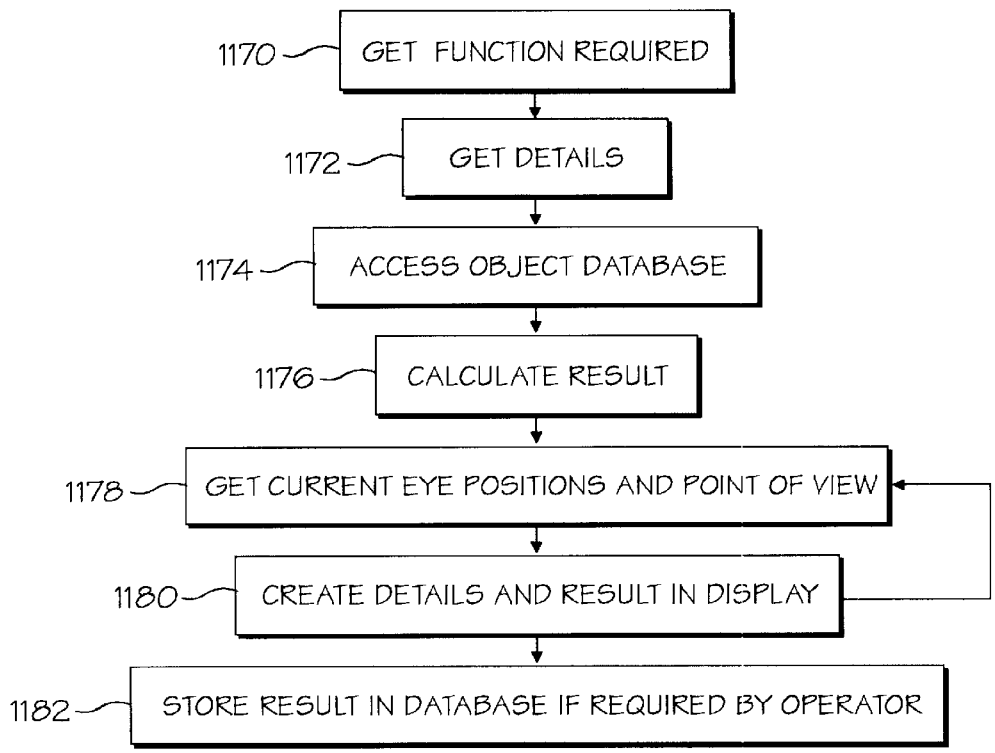
FIG. 24 is a flowchart indicating how a function such as that shown in FIG. 22 may be implemented.

FIG. 24 is a flowchart which broadly outlines a routine by which the rendering system 400 may provide a calculation function for the operator, such as the intersection of azimuths function described in relation to FIG. 22. The operator first indicates to the renderer in step 1170 that a function is required, by selecting an option on the manual or virtual controllers shown in FIG. 4c or FIG. 19, for example. Details are then input by the operator in step 1172 using input screens such as those shown in FIGS. 23a and 23b. The renderer then accesses the object database to check and obtain position information relating to the input in step 1174. Information is presented to the operator and the required calculation takes place in step 1176. The renderer also calculates the current field of view as previously described, and if required by the operator, generates images for the see through display as shown in FIG. 22 in a loop formed by steps 1178 and 1180. The operator may request storage of the result of the calculation in step 1182 and the routine may be ended or the calculation may be repeated with different input.

Figure 25:
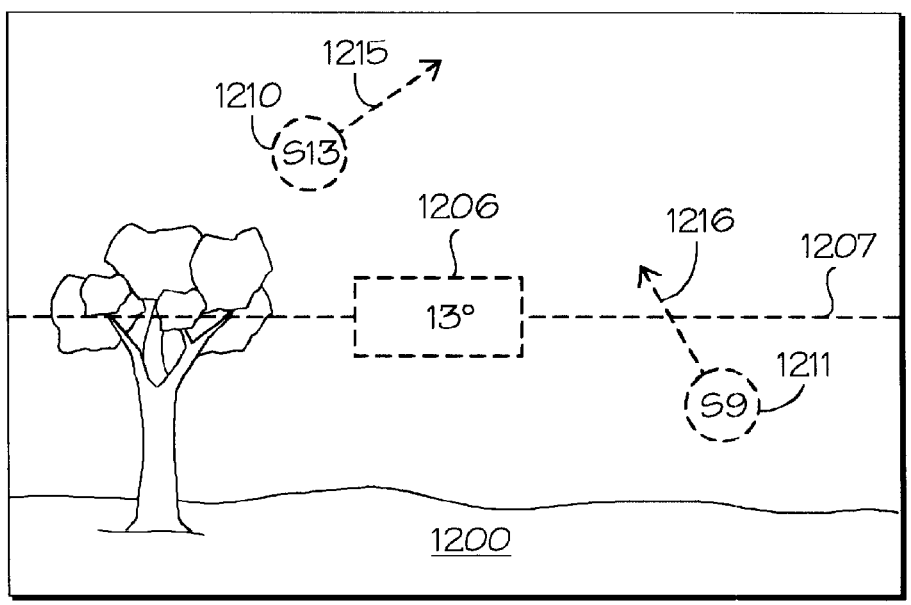
FIG. 25 shows an augmented field of view in which an elevation mask and a number of satellite positions have been displayed.

FIG. 25 shows an augmented field of view demonstrating a function by which the location and acceptability of signal sources in a remote positioning system, such as satellites 120 in FIG. 1, can be indicated to the operator. Satellite signals originating below a minimum elevation are usually ignored by the roving apparatus due to atmospheric effects which degrade signal quality. A mask angle of about 13–15∞ is used by default or may be selected by the operator depending on the number of satellites available for a position measurement and the precision required in the measurement. In this case the operator is looking towards the horizon 1200 and virtual objects indicating the minimum elevation and the location of two satellites in the field of view have been presented in the display 415. A mask angle of 13∞ is shown in a box 1206 and the minimum elevation is indicated by a dashed line 1207. One of the satellites coded "S9" lies in a solid angle indicated by a circle 1211 and is moving relative to the operator in a direction indicated by arrow 1216. It is currently below the minimum elevation line 1207 but is moving higher. The other satellite "S13" indicated by a circle 1210 is above line 1207 and also moving higher in a direction indicated by arrow 1215. Information related to the current elevations and expected positions of these two satellites, or summarizing all of the satellites above the horizon, could be presented on the display to assist the operator. The other satellites would be revealed to the operator by a scan around the horizon or upwards towards the zenith. It will be appreciated that the view shown here is given from the operator's viewpoint, and that satellite information could be presented by other views such as a vertical section through the operator and zenith, or a horizontal section centered on the operator.

Figure 26:
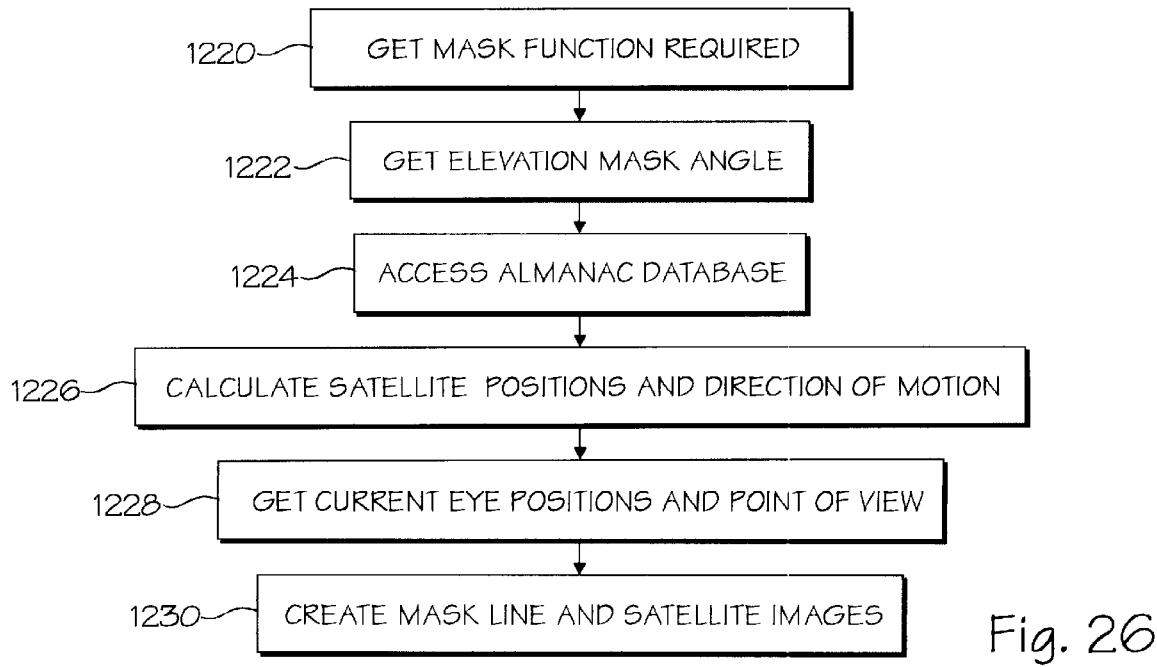
FIG. 26 is a flowchart indicating how an elevation mask function may be implemented.

FIG. 26 is a flowchart which broadly outlines how the rendering system 400 may indicate the availability of signal sources to an operator using an augmented field of view such as shown in FIG. 25. In step 1220 the operator first indicates to the roving apparatus that a mask related display is required. The required mask angle is then retrieved from stored information by the renderer in step 1222, or entered by the operator. Access to an almanac of satellite information is then required at step 1224 in order to calculate current satellite locations and related data in step 1226. The renderer next determines the operator's current field of view as already described in detail above, and generates images which indicate the mask elevation and those satellites which are within the field of view in steps 1228 and 1230. Steps 1224 to 1230 from a loop which continually updates the display as the operator's field of view changes.

Figure 27:
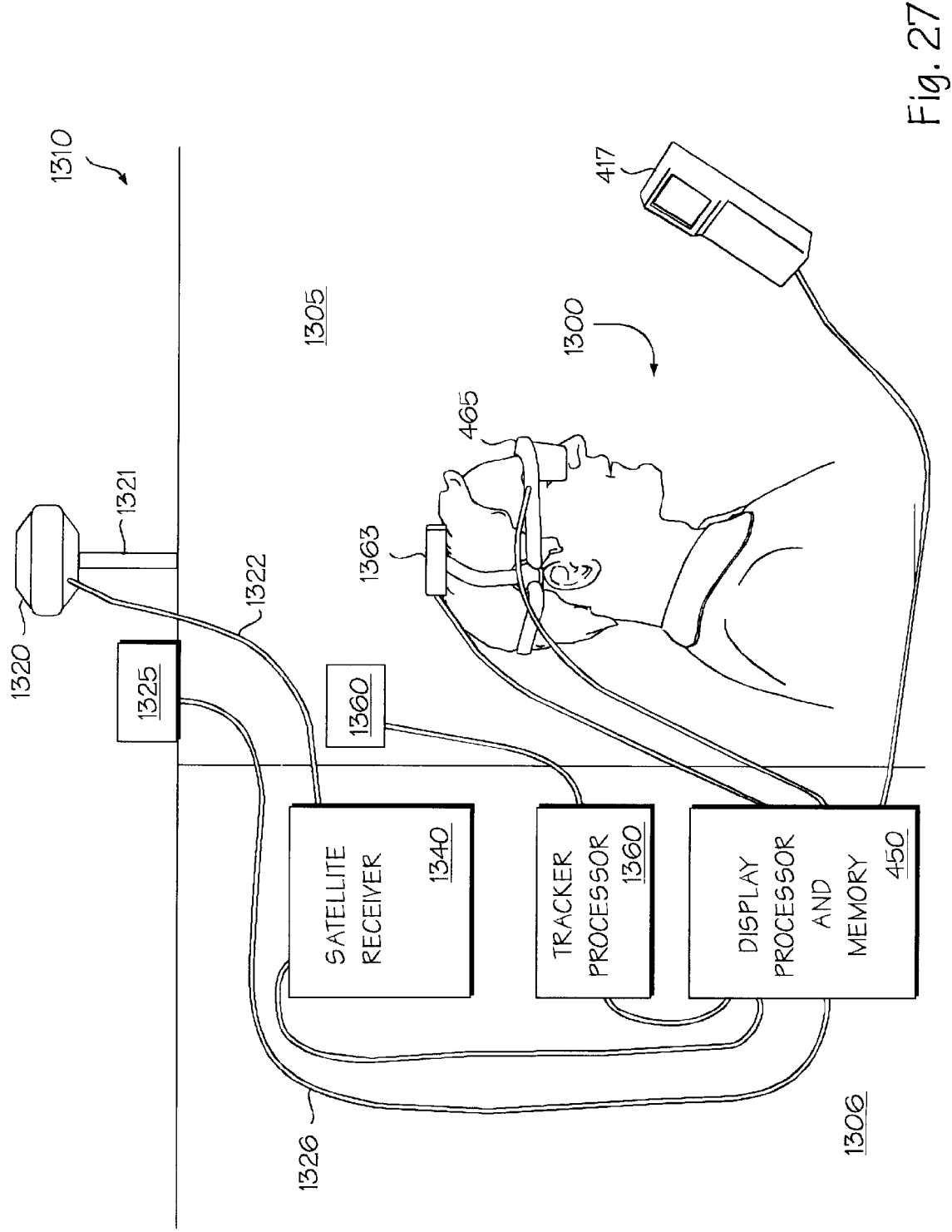
FIG. 27 is a schematic side view of an operator at work in a machine using another embodiment of the apparatus for machine control.

FIG. 27 is a schematic diagram showing elements of a further embodiment of apparatus according to the invention, providing augmented vision capability for a machine operator. In this embodiment an operator 1300 is shown working from the cab 1305 or control point of a machine 1310, typically a vehicle such as a truck 361 or excavator 366 as shown in FIG. 3b. However, the range of machines and the purpose to which they are put is not limited in this regard. The apparatus contains hardware, software and database components which are generally similar to those of FIG. 4a although some differences result from the operator placement on a machine. A display processor and memory 450 containing a rendering system 400 and object database 420, and a headset 465 containing an augmented display 415 are provided. An operator interface 417 which may be manual or virtual, or enabled in some other form such as voice control, is also generally provided. However, the real time head position and orientation systems 405 and 410 may comprise a tracking system such as the Polhemus 3D devices mentioned above, for convenience in determining the position and orientation of the operator's head with respect to the machine. In this embodiment a satellite antenna 1320 is carried by the machine mounted on a pole 1321 or directly on the machine. This antenna requires an orientation sensor 1325 to account for motion of the machine, similar to the motion of the backpack described in relation to FIG. 5b. Satellite signals from the antenna are passed along cable 1322 to a satellite receiver 1340 in or on the body 1306 of the machine, for signal processing, and from the receiver to the display processor along cable 1341. Signals from the vehicle orientation sensor 1325 are passed on cable 1326 to the display processor.

The position of the head of operator 1300 may be determined in various ways, preferably by using a tracker transmitter 1360, tracker receiver 1363 and tracker processor 1366. Transmitter 1360 mounted on the machine emits a magnetic field with provides a frame of reference for the receiver 1363 mounted on the operator's head. The receiver 1363 detects the magnetic fields emitted by the transmitter 1360 and sends information to the processor 1366 for analysis. The reference frame provided by the transmitter 1360 is itself referred to the position determined by the antenna 1360 through a known geometrical relationship of these components on the body of the machine. A tracker system of this kind is available under the trademark 3SPACE INSIDETRAK as mentioned above in relation to FIG. 18. Other fields may also be emitted by the transmitter to provide a reference frame such as those in ultrasonic or optical based systems. Other processor arrangements may also be envisaged in which the tracker processor 1366 and display processor 450 are combined for example. It will be appreciated in general that various alternative systems for determining the position and orientation of the machine and the position and orientation of the operator's head may be devised. One combined position/orientation system which might be used for the machine is the TANS™ Vector GPS Attitude System, available from Trimble Navigation Ltd, in which an array of four satellite antennae produce three axis attitude and three dimensional position and velocity data. This replaces the single antenna 1320 and orientation sensor 1325. An alternative position/orientation system for the operator's head would be a mechanical head locator, by which the operator must place his or her head in a predetermined fashion in a headrest, for example, with the headrest having a known geometrical relationship with respect to the antenna 1320. This would replace the transmitter 1360, receiver 1363 and processor 1366 system.

Figure 28:
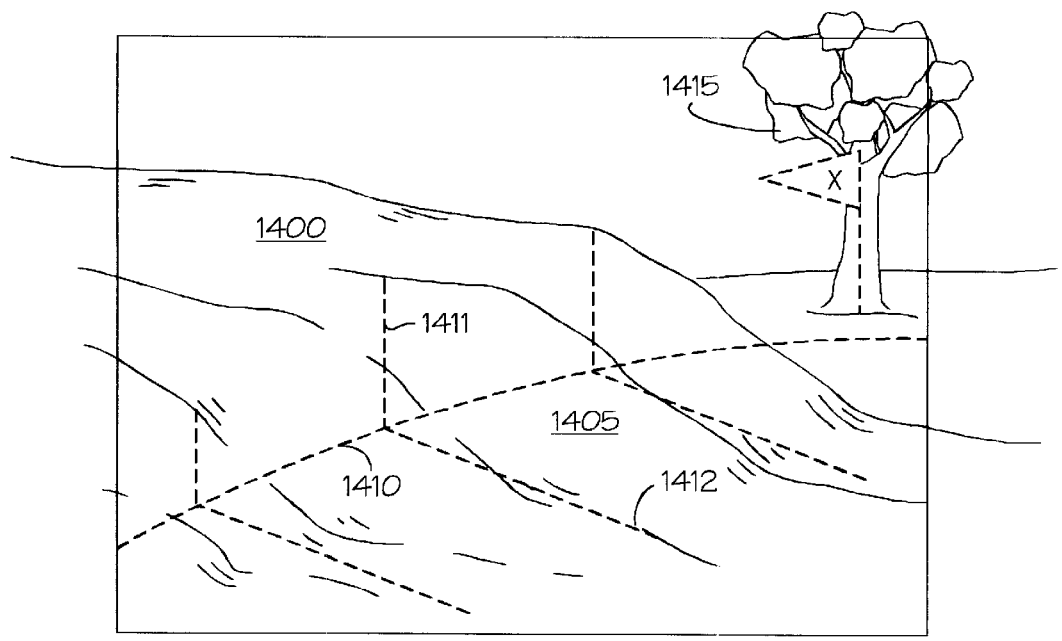
FIG. 28 shows an augmented view as seen by a machine operator on a road construction site.
Figure 29:
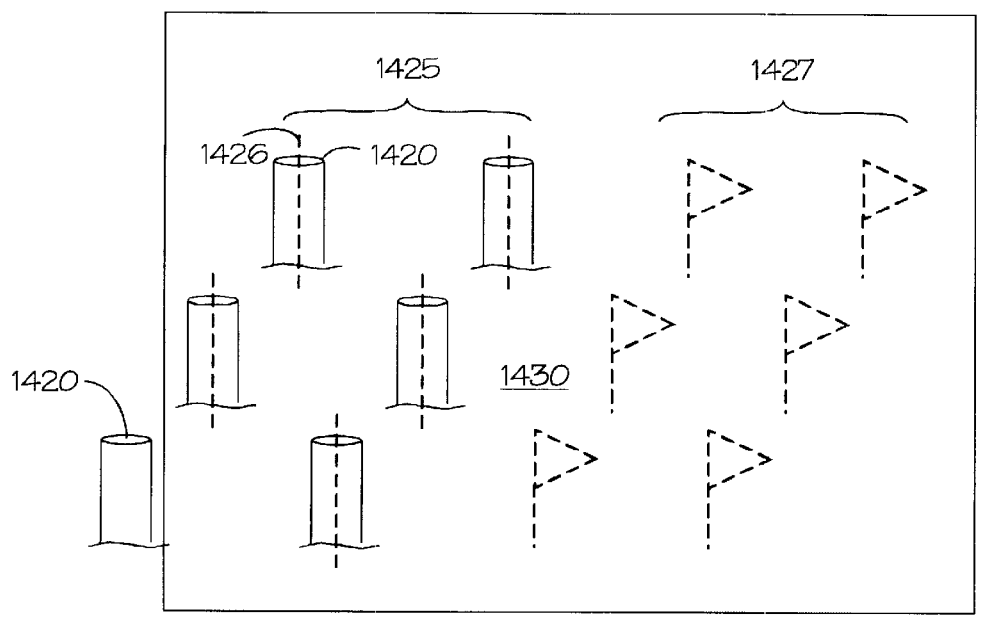
FIG. 29 shows an augmented view as seen by machine operator on a pile driving site.

FIGS. 28 and 29 are augmented fields of view demonstrating environments in which a machine operator as described in relation to FIG. 27 might be at work. Other environments and fields of view are shown in FIGS. 3a, 3b, and FIGS. 11, 13, and it will be appreciated that these are all given by way of example only. FIG. 28 shows an embankment 1400 through headset 465, which is to be cut away to form the shoulder of a road 1405. The layout of the road has been determined in previous survey and design work, and the required survey points, virtual objects and attribute information have been stored in a database of features, as previously described. The machine operator views the embankment through the headset and sees the road design in a virtual form superimposed on the existing earth formation. Concealed features to be avoided such as pipes and cables may also be indicated as virtual objects. The work involves removing earth from the embankment using an excavator to form a surface indicated by a dashed curve 1410, vertical lines 1411 and horizontal lines 1412. A real tree 1415 is flagged for removal with a virtual "X". FIG. 29 shows a set of pile positions as seen by a piling machine operator through the headset 465. The piles 1420 are being put in place to form the foundation of a building or support for a wharf, according to survey point positions which have been determined and stored in the object database 420. The medium 1430 between the piles is earth or water respectively in these examples. Piles 1425 have already been put in place and their positions are marked by virtual lines 1426. Other piles are yet to be placed at positions marked by virtual flags 1427. The operator guides the piling machine into position to drive home the remaining piles where required.

Figure 30:
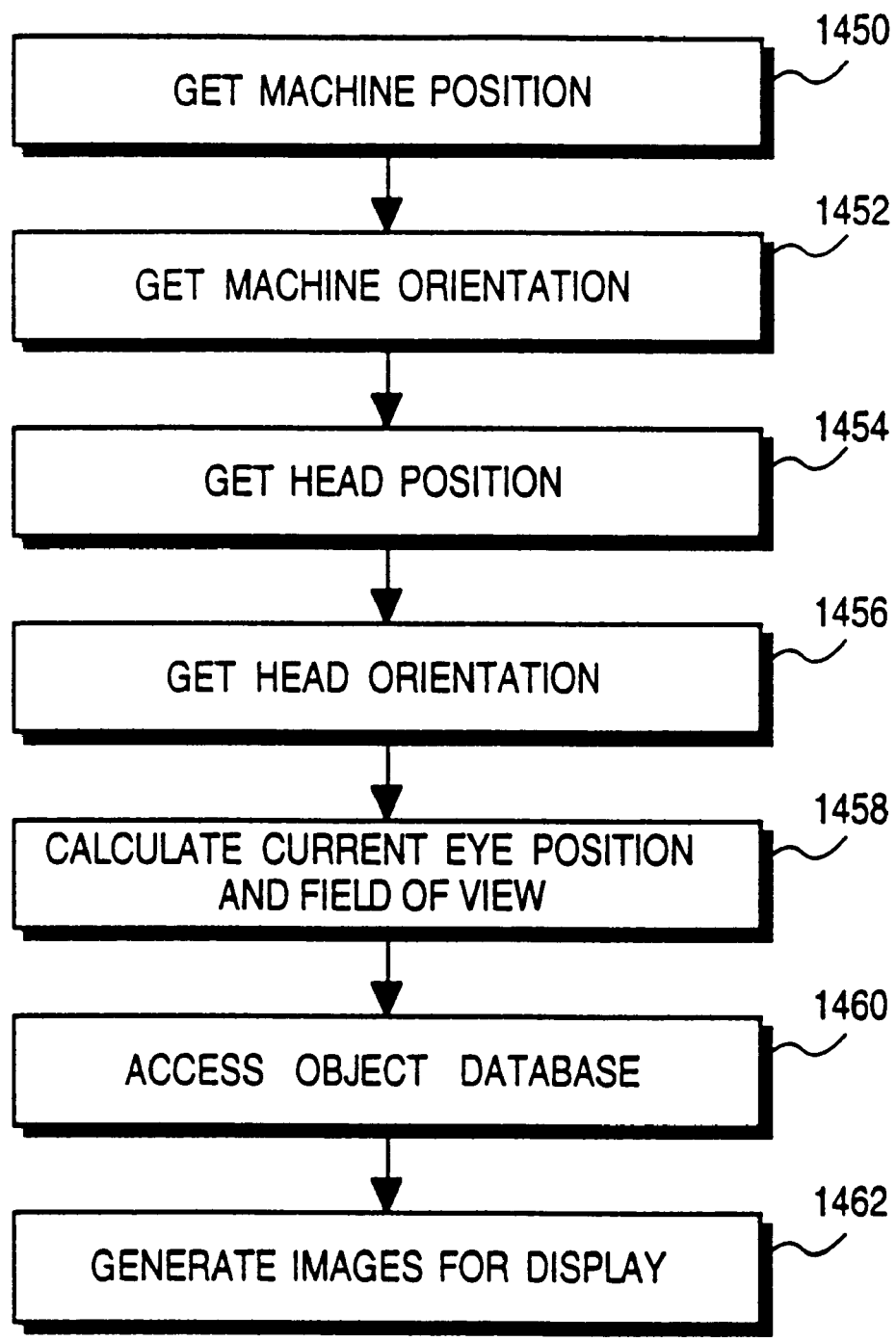
FIG. 30 is a flowchart indicating generally how the apparatus shown in FIG. 27 creates an augmented field of view for the machine operator.

FIG. 30 is a flowchart which broadly outlines a routine which is continuously repeated by software in the rendering system 400 to create an augmented display for the operator 1300 in FIG. 27. In step 1450 the renderer first gets a current position measurement for the machine from antenna 1320 and receiver 1340. An orientation measurement will also normally be required from sensor 1325 in step 1452, in order to determine the position of the tracker transmitter 1360 with respect to the antenna 1320. Transmitter 1360 and antenna 1320 are fixed to the machine and the transmitter position is readily determined by a matrix calculation as indicated above for any yaw, pitch and roll of the machine away from an initially calibrated orientation. The renderer then gets the operator head position and orientation in steps 1454 and 1456, by a determination of the position and orientation of the tracker receiver 1363 with respect to the tracker transmitter 1360, through the tracker processor 1360. A geometrical relationship between the tracker receiver and the operator's eyes is then assumed, such as described in relation to FIG. 6a, to calculate the eye positions, and eventually the operator field of view. Information relating to the position, shape and attributes of virtual objects which are to be displayed is then obtained from database 420 in step 1460. Finally an image is created for each eye using the database information, and passed to the headset for display in step 1462. More detail for this last step has already been given in relation to FIG. 9 above.

Roving survey apparatus having an augmented vision capability according to the present invention provides a wide range of functions and potential applications for survey operators. Many of the functions involve use of virtual objects such as a range pole or controller which have been described. In most apparatus these functions will be provided with conventional counterparts such as a real range pole and real controller. Many of the potential uses are specialized and remain to be fully considered but have been indicated by way of example. Apparatus for use by a machine operator has also been described. A few of the possible uses have been described and more will be evident to a skilled reader within the scope of the following claims.

I claim:

1. A method for measuring a position of a survey point comprising:

determining a current field of view of an operator;

determining an initial position in the current field of view for a virtual point locator;

displaying an image containing a representation of the virtual point locator at the initial position according to the current field of view;

determining successive offset positions for the virtual point locator;

displaying successive images of the virtual point locator according to the current field of view and the offset positions; and selectively storing positions of the virtual point locator as survey points.

2. The method as set forth in claim 1, wherein the steps of displaying display images of the virtual point locator on see-through display such that the virtual point locator is superimposed on a real image seen through the current view field of view.

3. The method as set forth in claim 1, wherein the step of determining an initial position for a virtual point locator comprises the steps of measuring a current position of a physical point locator and determining the initial position as an offset from the physical point locator.

4. The method as set forth in claim 3, wherein the physical point locator is selected from the group comprising a range pole and coupled positioning system antenna, and a head mounted positioning system antenna.

5. The method as set forth in claim 1, wherein the images of the virtual point locator comprise a visual representation of a range pole when in the field of view.

6. The method as set forth in claim 1, further comprising the step of receiving offset commands from the operator through a virtual controller device, said offset commands determining successive offset positions.

7. The method as set forth in claim 1, further comprising the step of regenerating the virtual point locator at the initial position in response to a reset command.

8. A method for controlling a survey operation comprising the steps of:

receiving a command from an operator to receive input;

determining a current field of view for the operator;

determining a display position in the current field of view for a virtual control object;

displaying an image comprising a representation of the virtual control object at the display position, said image including operator input options corresponding to the virtual control object; and activating a survey apparatus to implement a selected input option in response to selection of the selected input option.

9. The method as set forth in claim 8, wherein the step of displaying displays images of the virtual control object on see-through display such that the virtual control object is superimposed on a real image seen through the current view field of view.

10. The method as set forth in claim 8, wherein the step of determining a position for a virtual control object comprises the steps of measuring a current position of a physical point locator and determining the position as an offset from the physical point locator.

11. The method as set forth in claim 10, wherein the physical point locator is selected from the group comprising a range pole and coupled positioning system antenna, and a head mounted positioning system antenna.

12. The method as set forth in claim 8, wherein the representation of the virtual control object is selected from the group comprising a representation of a survey control device and a hand held controller having a keypad and a display.

13. The method as set forth in claim 8, wherein further comprising the step of the operator selecting a selected input option using a pointing device.

14. The method as set forth in claim 13, further comprising the step of monitoring a glove worn by the operator and using a finger position of the operator to select the input option.

15. A method for viewing data comprising:

measuring a current position of an operator on a site using a position survey system;

measuring a current head orientation of the operator;

determining a current field of view of the operator through the display according to the current position and current head orientation measurements;

presenting an image containing a representation of at least one satellite in the remote positioning system which are within the field of view.

16. The method as set forth in claim 15, further comprising:

determining a mask elevation below which satellite signals are ignored when position measurements are taken; and presenting an image containing a representation of the mask elevation.

17. A method for viewing information during a procedure for determining locations on a site comprising:

measuring a current position of an operator on a site;

measuring a current head orientation of the operator;

determining a current field of view of the operator through the display according to the current position and current head orientation measurements;

displaying an image containing at least one representation of a location of a point on a see through display oriented in the operator's current field of view such that the at least one representation is superimposed at a position in the field of view, said displaying comprising;

displaying an image at the location of the point if the point is within the current field of view, and displaying an image comprising an indicator as to where the point lies on the site fi the point is not within the current field of view; and generating and presenting subsequent images of representation of a location of a point as the operator navigates around the site and the current field of view changes.

18. The method as set forth in claim 17, wherein the procedure comprises a survey to check a design, said method further comprising the step of referencing a predetermined layout of locations of a plurality of features in the design, wherein an image displayed at the location comprises a representation corresponding to the feature.

19. A system for measuring a position of a survey point comprising:

a display configured to display images relative to a current field of view of an operator;

a storage device configured to store survey points;

a controller coupled to the display and the storage device, said controller configured to determine a current field of view of an operator, determine an initial position in the current field of view for a virtual point locator, display an image on the display, said image containing a representation of the virtual point locator at the initial position according to the current field of view, determine successive offset positions for the virtual point locator, display successive images of the virtual point locator according to the current field of view and the offset positions, and selectively store in the storage device positions of the virtual point locator as survey points.

20. The system as set forth in claim 19, wherein the display comprises a heads up see through display configured such that the virtual point locator is viewed as superimposed on a real image seen through the current view field of view.

21. The system as set forth in claim 19 further comprising a physical point locator, said controller further configured to determine an initial position for the virtual point locator according to the current position of a physical point locator and the initial position as an offset from the position of the physical point locator.

22. The system as set forth in claim 21, wherein the physical point locator is selected from the group comprising a range pole and coupled positioning system antenna, and a head mounted positioning system antenna.

23. The system as set forth in claim 19, wherein the images of the virtual point locator comprise a visual representation of a range pole when in the field of view.

24. The system as set forth in claim 19, further comprising a virtual controller device configured to receive offset commands from the operator, said offset commands utilized to determine successive offset positions.

25. The system as set forth in claim 19, further comprising the step of regenerating the virtual point locator at the initial position in response to a reset command.

26. A system for controlling a survey operation comprising:
- an input device configured to receive a command from an operator;
- a current field of view of the operator;
- a display configured to display an image of a representation of the virtual control object at the display position, said image including operator input options corresponding to the virtual control object; and
- a survey apparatus coupled to the input device, said survey apparatus configured to implement a selected input option in response to selection of the selected input option through the input device.

27. The system as set forth in claim 26, wherein the displays comprises a heads up see through display such that images of the virtual control object are superimposed on a real image seen through the current view field of view.

28. The system as set forth in claim 26, further comprising a physical point locator, said the location of the virtual control object based upon a current position of a physical point locator.

29. The system as set forth in claim 28, wherein the physical point locator is selected from the group comprising a range pole and coupled positioning system antenna, and a head mounted positioning system antenna.

30. The system as set forth in claim 26, wherein the representation of the virtual control object is selected from the group comprising a representation of a survey control device and a hand held controller having a keypad and a display.

31. The system as set forth in claim 26, further comprising a pointing device configured to enable the operator to select a selected input option.

32. The system as set forth in claim 31, further wherein the pointing device is selected from the group comprising a glove and a mouse.

33. A system for viewing data comprising:
- a position survey system configured to measure a current position of an operator on a site;
- a measurement device configured to measure a current head orientation of the operator; and
- a display configured to provide a current field of view of the operator through the display according to the current position and current head orientation measurements, said display further configured to display an image containing a representation of at least one satellite in the remote positioning system which is within the field of view.

34. The system as set forth in claim 33, further comprising a mask elevation measurement device which determines an elevation below which satellite signals are ignored when position measurements are taken, said display further configured to display an image containing a representation of the mask elevation.

* * * * *